(12) United States Patent  
Tsukahara et al.

(10) Patent No.: US 6,510,287 B1  
(45) Date of Patent: Jan. 21, 2003

(54) CAMERA DISPLAY APPARATUS HAVING ROTATING ELEMENTS TO INDICATE INFORMATION

(75) Inventors: Daiki Tsukahara, Hiratsuka (JP); Hiroshi Wakabayashi, Yokohama (JP); Hitoshi Aoki, Tokyo (JP); Noboru Akami, Yokohama (JP); Yuji Katano, Kawasaki (JP); Noriyasu Kotani, Tokyo (JP); Seijiro Noda, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/245,917

(22) Filed: Feb. 8, 1999

Related U.S. Application Data

(63) Continuation of application No. 08/763,019, filed on Dec. 11, 1996, now abandoned, which is a continuation of application No. 08/309,608, filed on Sep. 21, 1994, now abandoned, which is a continuation of application No. 08/120,387, filed on Sep. 14, 1993, now abandoned.

(30) Foreign Application Priority Data

| Sep. 4, 1992 | (JP) | 4-245140 |
| Sep. 22, 1992 | (JP) | 4-257738 |
| Sep. 25, 1992 | (JP) | 4-256965 |
| Oct. 16, 1992 | (JP) | 4-278494 |
| Oct. 19, 1992 | (JP) | 4-279996 |
| Oct. 30, 1992 | (JP) | 4-281939 |
| Oct. 30, 1992 | (JP) | 4-292334 |

(51) Int. Cl.$^7$ .............................. G03B 17/08; G03B 7/04
(52) U.S. Cl. ...................................................... 396/281
(58) Field of Search ................................ 396/281, 284, 396/293, 294, 295

(56) References Cited

U.S. PATENT DOCUMENTS

| 4,044,370 A | 8/1977 | Kondo | 354/289 |
| 5,365,292 A | 11/1994 | Wakabayashi et al. | 354/76 |
| 5,732,296 A * | 3/1998 | Katano et al. | 396/281 |

* cited by examiner

Primary Examiner—Christopher Mahoney

(57) ABSTRACT

A display apparatus in a camera for displaying photographic information using rotating elements. The display apparatus includes rotating pointers which rotate about display scales to display the photographic information. The display apparatus further includes a control unit which receives camera control information and in response to the control information, the control unit controls driving circuitry which causes the rotating display pointer to point to an index on the display scale representing the photographic information.

35 Claims, 28 Drawing Sheets

CAMERA DISPLAY APPARATUS HAVING ROTATING ELEMENTS TO INDICATE INFORMATION

This application is a continuation of application Ser. No. 08/763,019, filed Dec. 11, 1996, now abandoned, which was a continuation of Ser. No. 08/309,608 filed Sep. 21, 1994, now abandoned, which was a continuation of Ser. No. 08/120,387, filed Sep. 14, 1993, now abandoned.

BACKGROUND OF THE INVENTION

1. Field of the Invention

The present invention relates to a display apparatus, and more particularly, to a display apparatus in a camera having rotating elements for indicating photographic information.

2. Description of the Related Art

Conventional analog-type display devices are known in which either one or a plurality of rotary pointers are used to indicate various information whereby the rotary pointers point to indices representative of the different information. In particular, cameras which use rotary pointer analog-type display devices are known in which information such as frame count, shutter speed, range value, self timer mode information, exposure correction information, etc. may be displayed individually or in various combinations. In order to indicate specific information, rotary pointers in known types of camera display devices are rotated by means of a stepping motor to point to display indices located above the pointer on scales containing the photographic information. For example, Japanese Patent Application No. 3-214613 discloses a small clock type display device wherein only one kind of information is displayed using a stepping motor to rotate a pointer.

A problem with these known types of rotating pointer camera displays, however, is that it is difficult to accurately display all the needed information in limited space on the camera body. Furthermore, it is difficult to accurately display all the needed information in a manner which quickly and easily conveys the information to a camera user. Still further, the known types of display devices sometime display erroneous information. As a result of the above-noted deficiencies, a camera operator may take poor photographs, or may miss photograph opportunities completely.

The above-noted problems have occurred in conventional display devices which use stepping motors to drive the rotation of display pointers. The stepping motors are small in size, highly reliable, and inexpensive and, therefore, their use to drive rotating pointers in display devices of cameras has been desirable. However, since the stepping motor is turned off when the electric power supply of a device using the stepping motor is turned off, the pointer of a display device will remain at the position at which it was located at the time power is turned off. The device in question may be in a state in which it is still operable, and thus, a user receives erroneous information regarding the operative state of the device.

In addition to displaying erroneous information, prior art rotary pointer type display devices suffer from difficulties in easily reading the display. In particular, rotary pointer type display devices are known which display a photographic frame count of the film. An example of such a display device is illustrated in FIG. 5. As seen in FIG. 5, a display 27 includes a rotary display pointer 25, which is geared to the film advance, and displays the current photographic frame count by pointing to a respective index on a corresponding display scale 27 in accordance with the film advance. However, in these prior art display devices, intervals between the indices indicating the frame count are small, and, therefore, it is difficult for a viewer of the display to determine the present photographic frame count. Furthermore, when the number of frames remaining becomes small, the possibility of missing photograph opportunities arises due to misreading of the remaining number of frames.

Conventional display devices are known in which a combination of different types of camera information is displayed pictorially using a liquid crystal display, or through the use of rotary dials which combine the setting and the display of photographic conditions such as shutter timing, stop value, etc. However, because of space limitations on the camera body, locating liquid crystal displays or rotary dials results in either a small, non-readable display, or increased cost and increased size of the camera. Furthermore, since display devices of cameras suffer limitations according to space and cost, in the past, only information restricted to the necessary minimum was displayed. Inessential and non-urgent information, for example, the cumulative number of exposed frames, was not displayed.

Previous rotating pointer type display devices have been unable to display adequate warning of certain failures and mistakes in the operation of the camera. For example, cameras are known that automatically set a combination of stop and shutter speed, when in a program exposure mode, according to the brightness of a photographic subject. When the combination of stop and shutter speed is sequentially changed (hereinbelow, this operation is termed "program shift"), if either the stop or the shutter speed reaches a predetermined interlock limit, beyond which shutter speed cannot become faster, further program shift becomes impossible. However, conventional rotary pointer type display devices cannot display this state, even if the stop or the shutter speed reaches the interlock limit during a program shift. As a result, the program shift operation continues for a short time without a photographer recognizing this state of affairs.

SUMMARY OF THE INVENTION

It is therefore an object of the present invention to provide a display apparatus in a camera which makes displayed information easily viewable by a user.

It is a further object of the present invention to provide a camera display apparatus which is relatively small in size and relatively inexpensive.

Yet a further object of the present invention is to provide a rotary pointer type camera display apparatus which displays a plurality of information in a highly visible manner.

It is another object of the present invention to provide a camera display apparatus which provides true and accurate information indicating the operative state of the camera. Still a further object of the invention is to provide a camera display apparatus which changes from a display of frame count information to a display of the number of frames remaining for exposure when the number of exposures remaining becomes small.

Another object of the present invention is to provide a camera display apparatus wherein different types of display information are displayed on a single display using display pointers having plural indication ends which point to different display scales.

Yet another object of the present invention is to provide a camera display apparatus wherein the photographic frame count can be recognized instantly.

A further object of the invention is to provide a camera display apparatus having a single rotary pointer which indicates both frame count information in a normal mode of operation and time until exposure in a self-timing mode of operation.

Yet another object of the present invention is to provide a camera display apparatus which includes a small display located within a larger display wherein viewing of one display does not interfere with viewing of the other.

Yet a further object of the present invention is to provide a display apparatus in a camera which utilizes a single pointer and a plurality of pointer scales in order to display combinations of different information in a single display.

Still a further object of the present invention is to provide a rotary pointer analog-type display apparatus for a camera which can provide a warning display if the stop or shutter speed exceed an interlock limit during a program shift.

Yet another object of the present invention is to provide a display apparatus for a camera which includes display of inessential and non-urgent information.

The above objects are achieved by providing a display apparatus in a camera for displaying photographic information using rotating elements, comprising (a) means for generating camera control information; (b) display means, including at least one rotating pointer and at least one display scale having indices, for representing the photographic information; (c) drive means for rotating at least one rotating pointer to a position on the at least one display scale; and (d) control means responsive to the camera control information for controlling the drive means to rotate the at least one pointer to an index on the pointer scale representing the photographic information.

BRIEF DESCRIPTION OF THE DRAWINGS

These and other objects and advantages of the invention will become apparent and more readily appreciated from the following description of the preferred embodiments, taken in conjunction with the accompanying drawings, of which.

DESCRIPTION OF THE PREFERRED EMBODIMENTS

Reference will now be made in detail to the present preferred embodiments of the invention, examples of which are illustrated in the accompanying drawings.

Figure 1A:
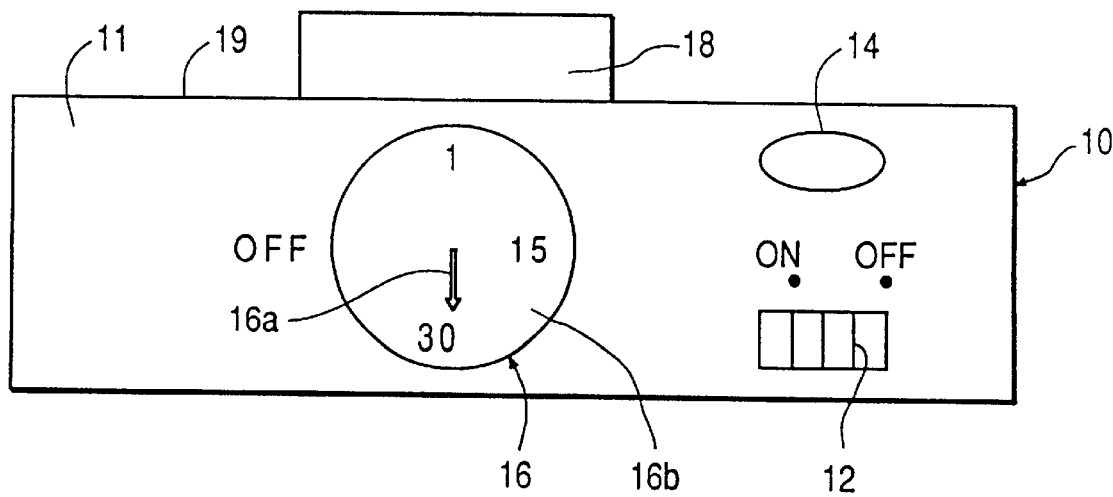
FIG. 1A is a schematic top view of a top surface of a camera having a display apparatus in accordance with a first embodiment of the present invention.
Figure 1B:
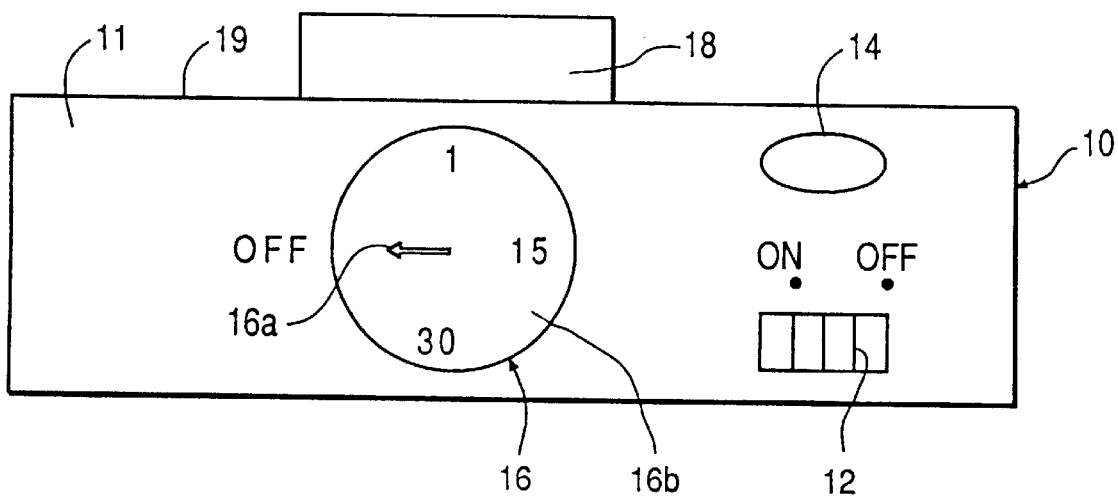
FIG. 1B is a schematic top view of a top surface of a camera having a display apparatus in an OFF state in accordance with the first embodiment of the present invention.

FIG. 1A illustrates a camera 10 which includes a display apparatus in accordance with a first embodiment of the present invention. Arranged on a top surface 11 of camera 10 is a main switch 12 for selecting an operative or inoperative state of the camera 10, a release button 14, and a display unit 16 having a rotary pointer 16a for indicating a frame count on a circular pointer scale 16b. A photographic lens barrel 18 is located on a front surface 19 of camera 10. As can be seen in FIG. 1A, the main switch 12 of the camera 10 is shown in the ON state indicating an operative state, and rotary pointer 16a indicates a frame count of 30 on the pointer scale 16b. FIG. 1B shows the display unit 16 when the main switch 12 of camera 10 is in the OFF position indicating an inoperative state. In this state, rotary pointer 16a points to the OFF indicator on display 16.

Figure 2:
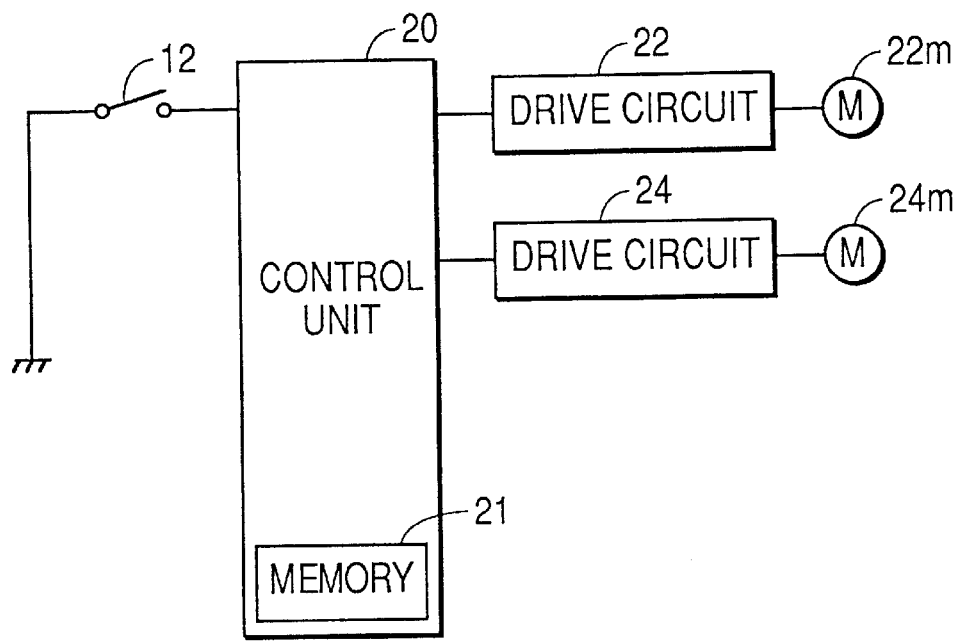
FIG. 2 is a block diagram showing a circuit for controlling a camera display apparatus in accordance with the first embodiment of the present invention.

FIG. 2 is a block diagram showing a system for controlling camera operations, and, in particular for the positioning of rotary pointer 16a in accordance with information received from the main switch 12. A control unit 20 includes a microcomputer having a nonvolatile memory 21 and other peripheral components. The control unit 20 performs camera sequence control and various operations, and in addition performs display control of the display unit 16 by executing a control program as described in detail below. The control unit 20 controls a drive circuit 22 which drives a film forwarding motor 22m for performing both winding (i.e., advancing) and rewinding of camera film. Control unit 20 also controls drive circuit 24 which drives a stepping motor 24m to cause the pointer 16a of the display unit 16 to rotate in proportion to an amount of advance of the film.

Figure 3:
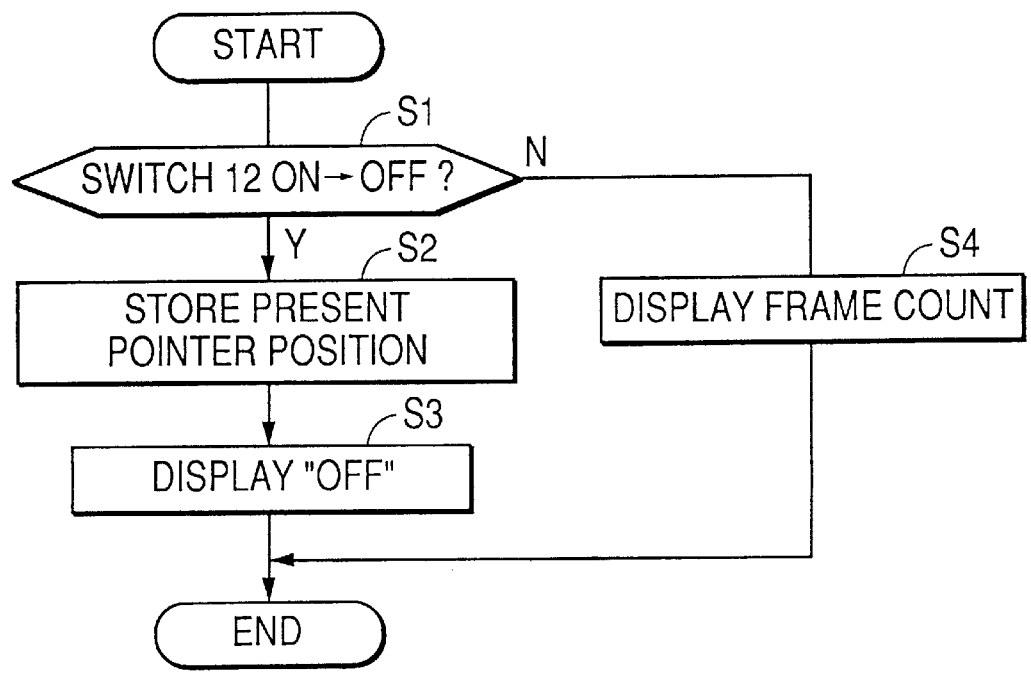
FIG. 3 is a flowchart illustrating a display control program for controlling a rotary pointer in a camera display apparatus in accordance with the first embodiment of the present invention.
Figure 4:
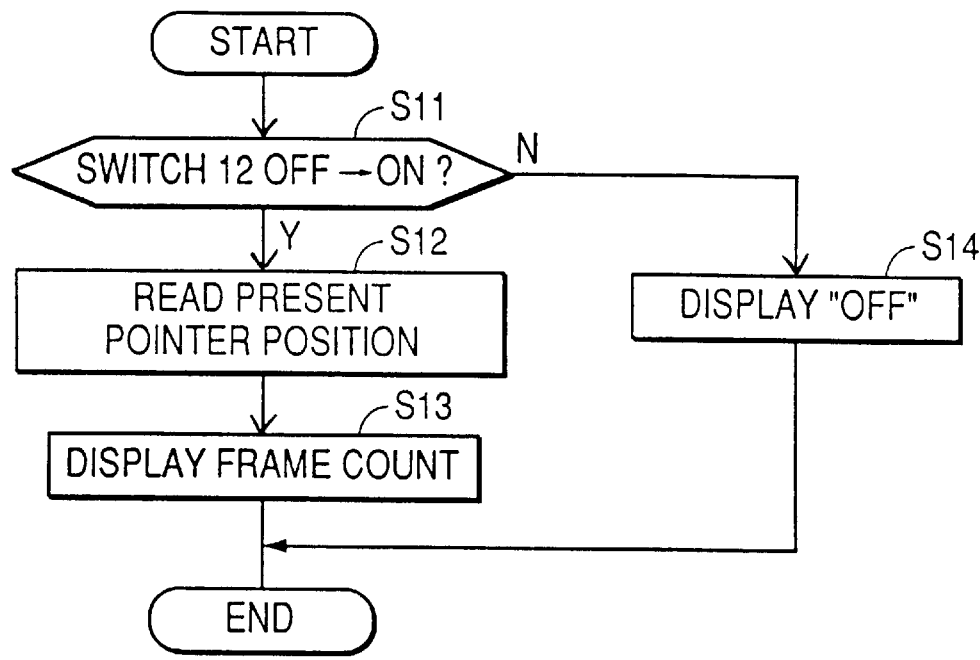
FIG. 4 is a flowchart illustrating a display control program for controlling a rotary pointer in a camera display apparatus in accordance with the first embodiment of the present invention.

FIGS. 3 and 4 are flow charts showing examples of control programs executed by control unit 20 to control positioning of display pointer 16a. Referring now to FIG. 3, FIG. 3 illustrates a display control program executed by control unit 20 when the main switch 12 is switched OFF. In step S1, it is determined whether the main switch 12 of camera 10 has been set ON or OFF, thereby placing the camera 10 in an operative or inoperative state, respectively. If main switch 12 is switched OFF, the program proceeds to step S2. If, however, main switch 12 has been left unchanged at ON, the program proceeds to step S4. In step S2, the present position of the pointer 16a is stored in the nonvolatile memory 21. The control unit 20 determines the present position of the pointer 16a by using either a frame count "1" position or the "OFF" position as a standard position of the pointer 16a, and then integrates an amount of rotation from the standard position every time the pointer 16a is driven to rotate accompanying frame advance of the film. Thus, the present position of the pointer 16a is known from the amount of rotation from the standard position. It is noted that because memory 21 is a nonvolatile memory, the present position of pointer 16a is stored even when there is no power supply to the camera 10. Having stored the present position of the pointer 16a, next, in step S3, the pointer 16a is driven by the stepping motor 24m to the OFF position indicating the inoperative state of the camera 10, as shown in FIG. 1B. If, however, in step S1 the main switch 12 is detected to be unchanged in the ON position, the program proceeds to step S4, and accompanying the normal operation of the camera the frame count is indicated on the display unit 16.

FIG. 4 is a flow chart of a display control program executed when main switch 12 is switched ON. In step S11, it is determined whether or not the main switch 12 is switched ON; when switch 12 has been switched ON, the program proceeds to step S12, but if not, it proceeds to step S14. In step S12, the present position of the pointer 16a, which is stored in the memory 21, is read out. Continuing, in step S13 the pointer 16a is driven by the stepping motor 24m and set to the position which was read out of memory 21, thereby displaying the frame count. However, in step S11, if the main switch 12 is unchanged in the OFF position, the program proceeds to step S14, and an indication of the inoperative position OFF continues.

In the above-described manner, when the camera 10 is set in the inoperative state by means of the main switch 12, the pointer 16a is set by means of the stepping motor 24m to the "OFF" mark on the pointer scale 16b, thereby clearly indicating the inoperative state of the camera 10.

The camera display apparatus according to the first embodiment of the present invention has been described with respect to a pointer driven to rotate above a circular pointer scale. However, configurations for display of the inoperative state and frame count are not limited by the above embodiment. For example, display apparatus of the first embodiment of the present invention may use a linear pointer scale where the pointer moves in a straight line. Furthermore, the display apparatus of the first embodiment of the present invention can also be applied to devices other than cameras.

Figure 6:
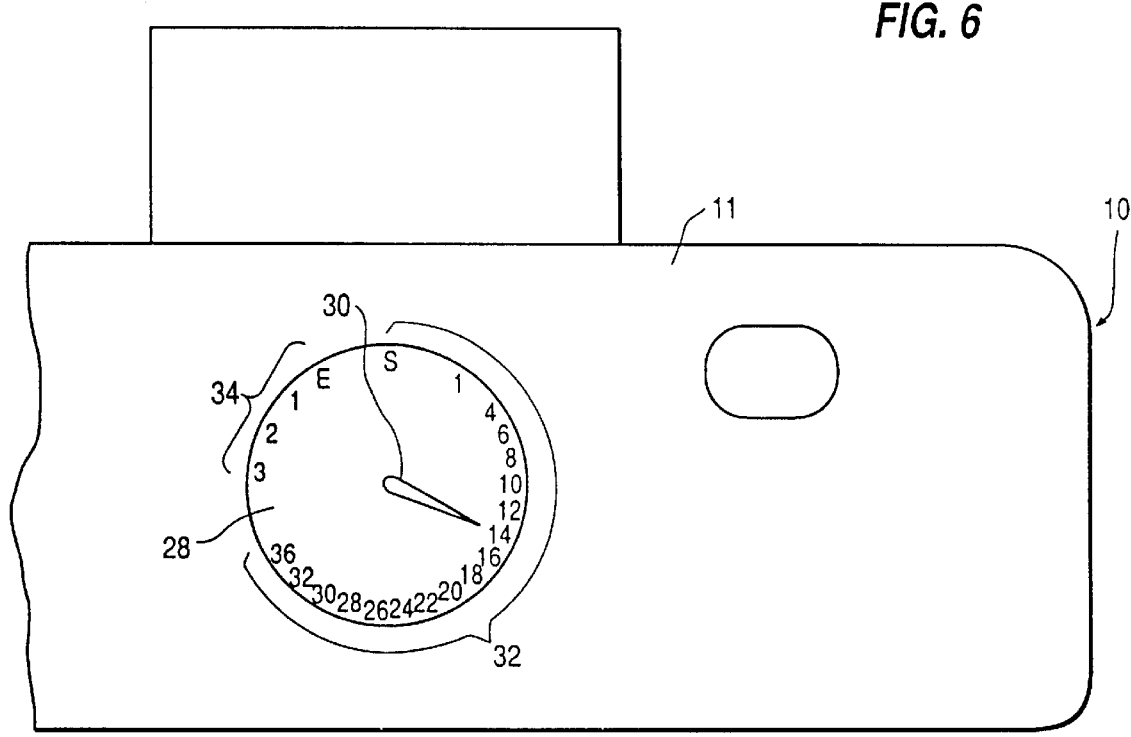
FIG. 6 is a partial schematic top view of a top surface of a camera including a display apparatus in accordance with a second embodiment of the present invention.

FIG. 6 is a top view of a camera 10 which includes a display apparatus in accordance with a second embodiment of the present invention. Like elements in the figures for the first and second embodiments have like reference numerals. Arranged on a top surface 11 of camera 10 is a display unit 28 having a rotary pointer 30 for indicating a number of frames photographed on a circular frame count display scale 32. In addition to the frame count display scale 32, the display unit includes a remaining frame count scale 34, which shows the remaining number of frames of film which can be exposed when the number of exposure frames remaining is small.

As will be described in greater detail below, the display pointer 30 is switched from displaying a frame count number on frame count scale 32 to displaying a remaining frame count on the remaining frame count scale 34 when the remaining number of frames of film which can be exposed is less than a prescribed number. By switching display scales in this manner, it is easy to determine the number of frames remaining, particularly when the number of frames remaining is small.

As seen in FIG. 6, the frame count display scale 32 consists of indices "S" and numerals from "1" through "36". The remaining frame count display scale 34 consists of indices "E" and numerals from "1" through "3". The numerals of the remaining frame count display scale 34 are more widely spaced apart than the numerals of the frame count display scale 32 such that the numerals indicated on the remaining frame count scale 34 can be instantly and precisely read out.

When film is not loaded in the camera 10 the display pointer 30 indicates "S"; when film is loaded, "1" is indicated, and each time photography is performed, "2", "3", etc. are then indicated in succession. The number of frames of a loaded film which can be exposed is automatically detected by means of a DX code reading device (not shown in the drawing), and, as will be described in detail below, at the time when a remaining frame count indicates 3 frames which can be exposed, the display pointer 30 is switched to display "3" on the remaining frame count display scale 34. With each exposure thereafter, "2" and "1" are indicated in succession, and when the frame count has become equal to the number of possible frames which could be exposed, "E" is indicated.

Figure 7:
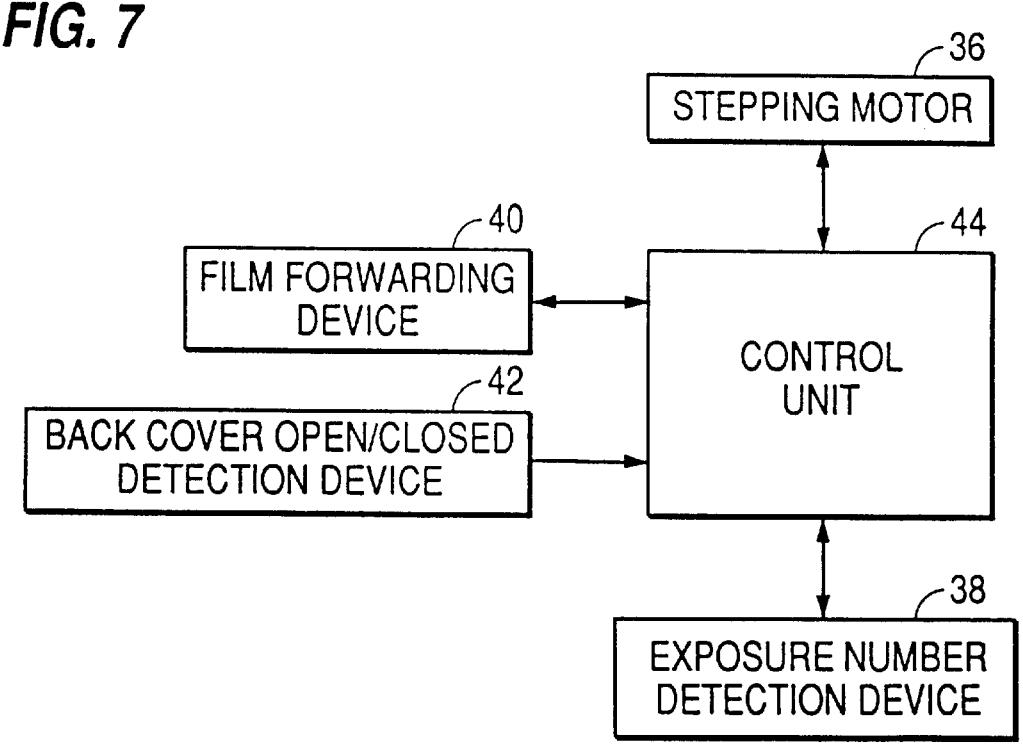
FIG. 7 is a block diagram showing a circuit for controlling the camera display apparatus in accordance with the second embodiment of the present invention.
Figure 5:
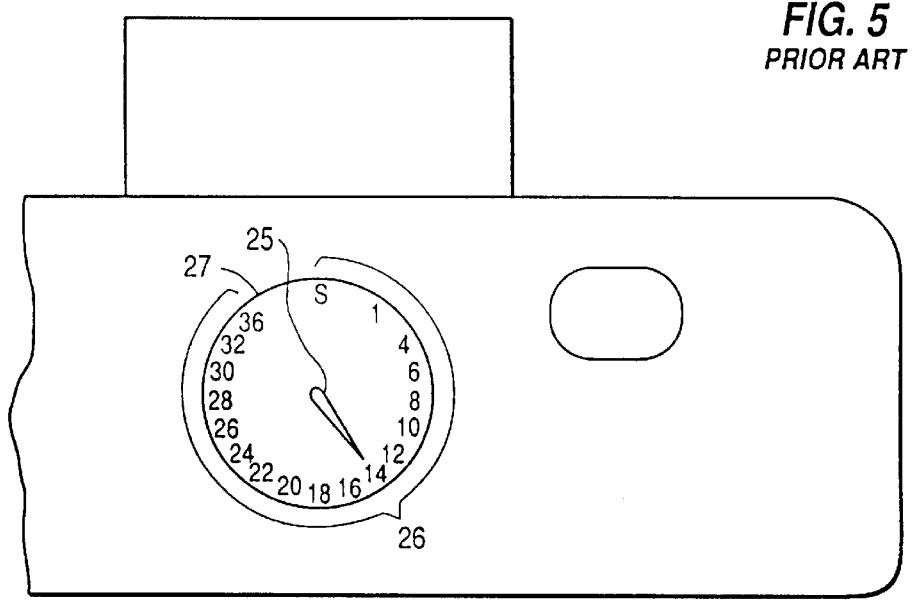
FIG. 5 is a partial schematic top view of a prior art type of camera display apparatus.

FIG. 7 is a block diagram showing a circuit for controlling display of photographic information in the camera display apparatus in accordance with the second embodiment of the present invention. Control unit 44 includes a CPU which receives and processes signals from an exposure number detection device 38, a back cover open/closed detection device 42, a film forwarding device 40, and stepping motor 36 which drives display pointer 30. Back cover open/closed detection device 42 detects whether the back of the camera is open or closed when the film is loaded or removed. Film forwarding device 40 forwards film each time a photograph is taken. Exposure number detection device 38 detects the number of frames of the loaded film which is possible to expose.

Figure 8:
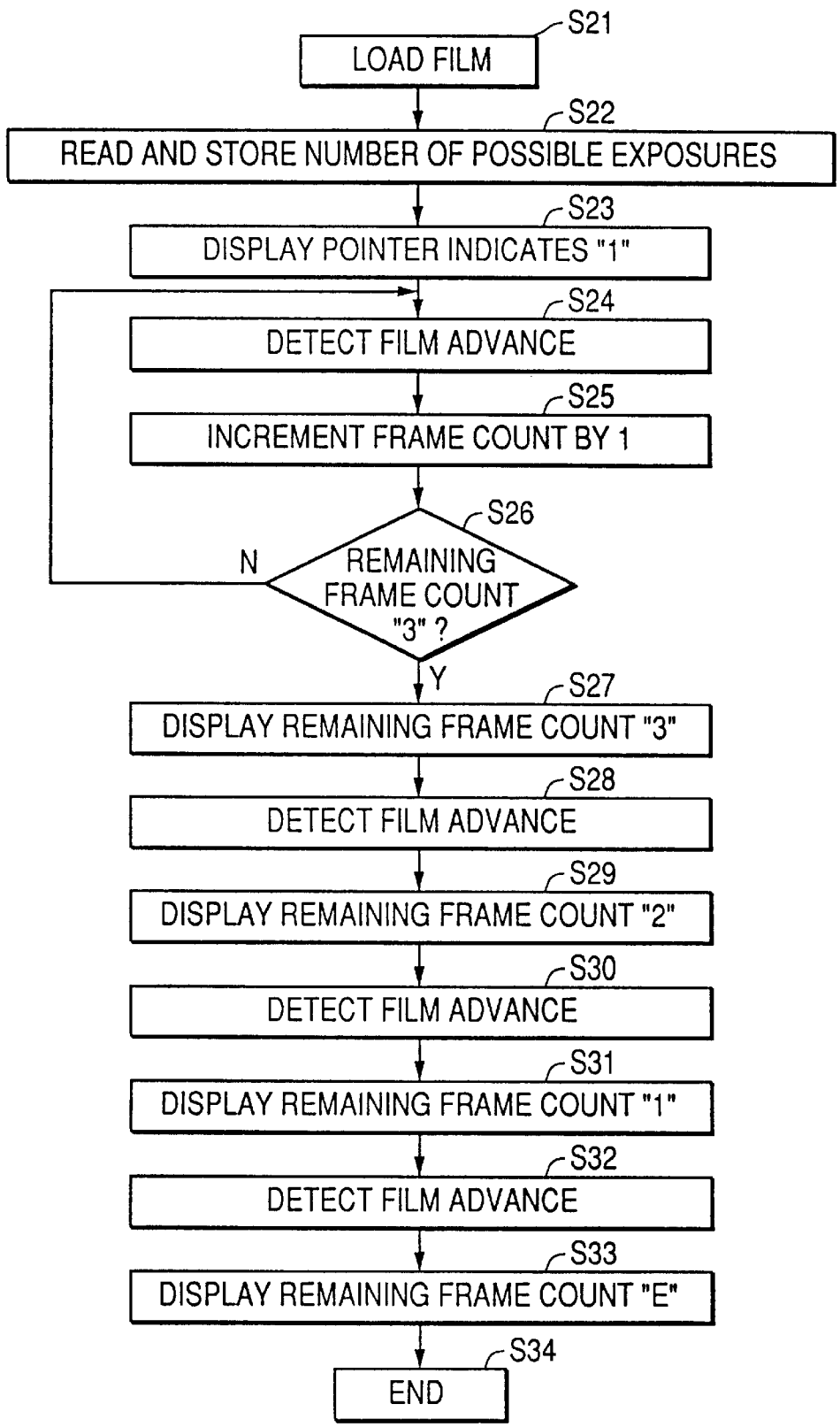
FIG. 8 is a flowchart illustrating a control program for displaying a remaining frame count in a camera display apparatus in accordance with the second embodiment of the present invention.

FIG. 8 is a flowchart showing an example of a display control program for controlling the display unit 28 for the display apparatus according to the second embodiment of the present invention. In step S21, the display control program is initiated when a signal from the back cover open/closed detection device 42 indicates that film is loaded and that the back cover is closed. Proceeding to step S22, an output signal from the exposure number detection device 38 indicating the number of possible exposures is read and stored in memory (not shown). In step S23, output signals are output to the stepping motor 36 thereby driving the display pointer 30 to indicate a frame count of "1". Continuing, in step S24, an output signal from the film forwarding device 40 is input, and when it has been detected that the film has been advanced after photography, the program proceeds to step S25. In step S25, signals are output to the stepping motor 36 in order to drive the display pointer 30 by 1 frame division, thereby incrementing the frame count by "1". Additionally, the photographed frame count is stored in step S25.

Continuing, in step S26 a determination is made as to whether or not the frame count which was stored in step S25 is within 3 frames of the number of possible exposures which was stored in step S22. If the stored frame count is within 3 frames of the number of possible exposures, the program proceeds to step S27; however, if the stored frame count is not within 3 frames, the program returns to step S24. In step S27, signals are output to the stepping motor 36, which drives the display pointer 30 to "3" on the remaining frame count scale 34, showing that there are 3 exposures remaining. Continuing, in step S28, when a signal from the film forwarding device 40 indicates that the film has been advanced one frame by winding after photography, the program proceeds to step S29. In step S29, the stepping motor 36, drives the display pointer 30 to show the remaining frame count "2" on remaining frame count scale 34 indicating two exposures remain. Continuing, in step S30, when a signal from the film forwarding device 40 indicates that the film has been advanced one frame by winding after photography, the program proceeds to step S31. In step S31, the stepping motor 36 drives the display pointer 30 to show the remaining frame count "1" indicating one exposure remains. Continuing, in step S32, when a signal from the film forwarding device 40 indicates that the film has been advanced by winding after photography, the program proceeds to step S33. In step S33, the stepping motor 36 drives the display pointer 30 to show the remaining frame count "E" indicating no exposures remain, at which point execution of the control program is ended. At this time, as in conventional cameras, the film may be rewound.

Although the display apparatus of the second embodiment of the present invention has been described as having a frame count display number which is added to with each exposure, a display which shows, at the time the film is loaded, the number of possible exposures and which reduces this number when each exposure is performed, is of course also possible. In this case, providing wide spaces between the indices of remaining frame count makes the display easier to see, and it is possible to instantly and accurately read out the remaining frame count.

Figure 9:
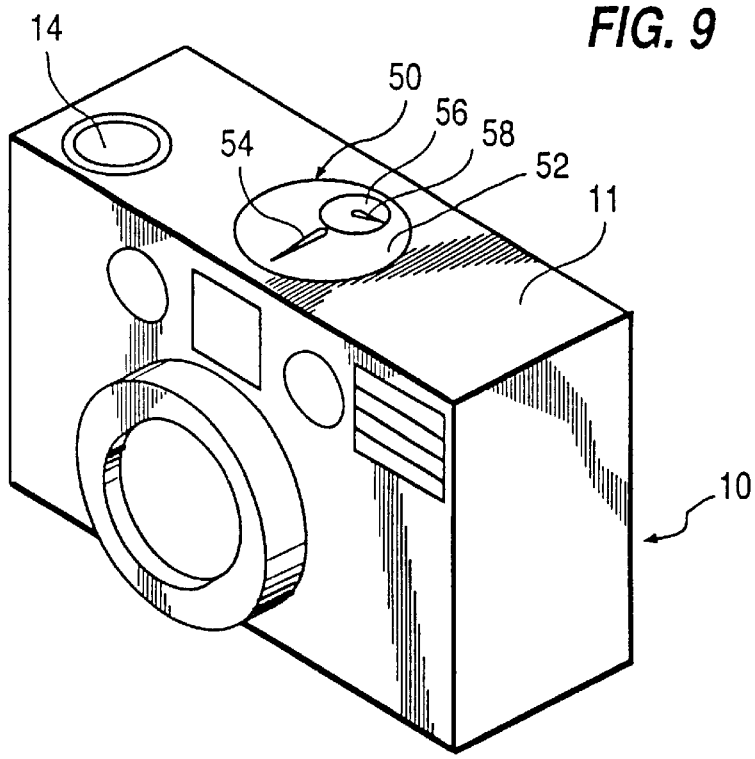
FIG. 9 is a perspective view of a camera having a display apparatus in accordance with a third embodiment of the present invention.

FIG. 9 is a perspective view of a display apparatus in a camera in accordance with a third embodiment of the present invention. Like elements in the FIGS. for the first, second and third embodiments have like reference numerals. FIG. 9 shows a camera 10 viewed from a perspective frontal view. Top surface 11 of camera 10 includes a display unit 50 having two display units 52 and 56. Display unit 52 is a frame count display unit with a frame count display pointer 54 which displays a photographic frame count of film, and display unit 56 is a strobe display unit with a strobe display pointer 58 which displays a strobe mode of operation. Top surface 11 of camera 10 also includes a release button 14.

Figure 10A:
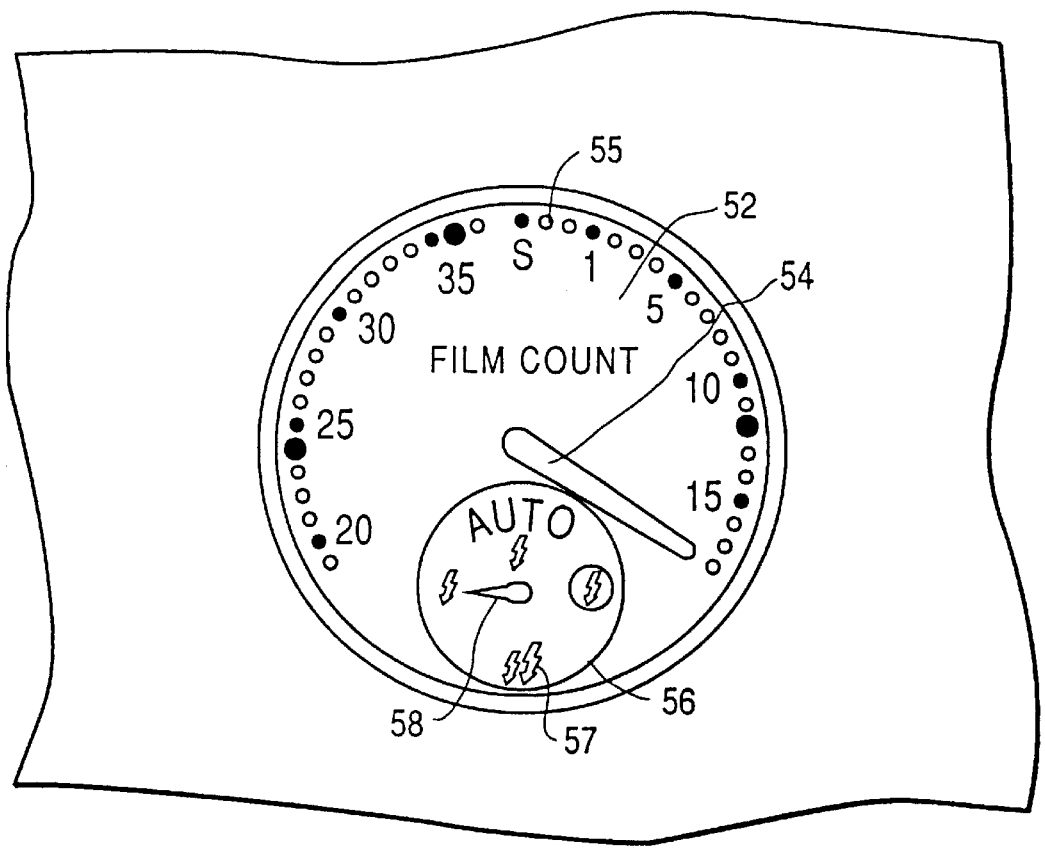
FIG. 10A is an enlarged view of the camera display apparatus in accordance with the third embodiment of the present invention.

FIG. 10A is an enlarged view of display unit 50. As seen in FIG. 10A, frame count display unit 52 includes frame count display pointer 54 and a frame count display pointer scale 55 with which to display a frame count 1–36 of the film. In FIG. 10A, the display pointer 54 indicates on pointer scale 55 that the frame count is at the 18th frame, denoting that the next photograph will be the 18th photograph. The pointer 54 rotates, for each frame advance, in a clockwise direction, and a frame number is numerically indicated every five frames on the display scale 55. Furthermore, the frame counts 12, 24 and 36 are conspicuously marked so as to indicate the number of exposures available on the film. The strobe display unit 56 includes strobe display indices 57 to display various strobe photography modes. Strobe display pointer 58 rotates to point to the various strobe display indices 57.

As illustrated in FIG. 10A, the frame count display scale 55 is interrupted after the 18th index, and begins again in a separate position on the 19th index. The strobe display unit 56 is positioned in this interrupted portion of the frame count display scale 55. As a result of this arrangement, frame count display pointer 54 may overlap the strobe display unit 56 and may obstruct a view of the strobe display unit, as described below. It is, therefore, necessary that the frame count display pointer 54 does not remain stationary when it overlaps strobe display unit 56.

Figure 10B:
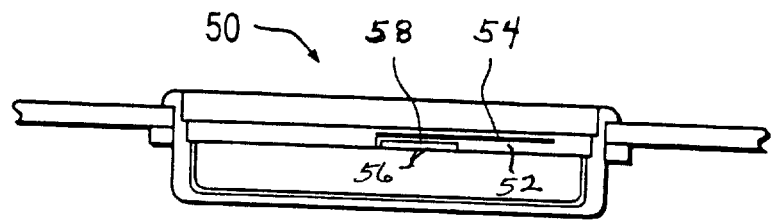
FIG. 10B is a side view of the camera display apparatus in accordance with the third embodiment of the present invention.

FIG. 10B is a cross-sectional side view of the display unit 50 of FIG. 10A. Within the display unit 50, stepping motors (not shown in the drawing) respectively drive the display pointers 54 and 58 of the frame count unit 52 and the strobe display unit 56. Since the positions of the pointers 54 and 58 in the direction of the axis of rotation are different, the pointers do not interfere with each other. In addition to the stepping motors, control unit (not shown in the drawing) is provided in display unit 50 which controls the display unit, and an electric battery is provided in order to store the position of the display pointer. The control unit of the camera, by sending signals to the control within the display unit 50, controls the display.

Figure 11:
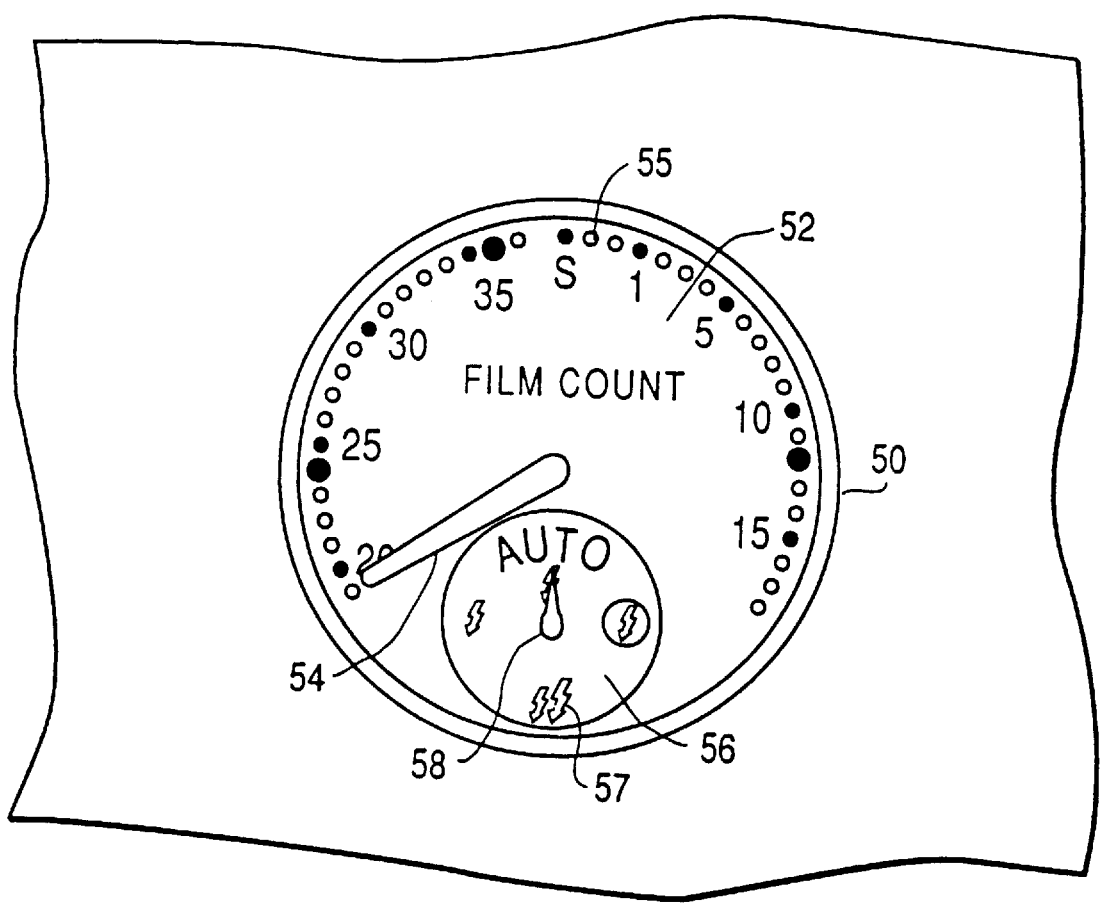
FIG. 11 is an enlarged view of the camera display apparatus in accordance with the third embodiment of the present invention.

FIG. 11 shows display unit 50 wherein frame count display pointer 54 indicates the 19th frame on frame count display scale 55. In order for the frame count display pointer 54 to move from the index indicating the 18th frame to the index indicating the 19th frame, the display pointer 54 must pass over strobe display unit 56. In order to prevent the frame count display pointer 54 from overlapping the strobe display unit 56, and thereby preventing the display content of display 56 from being viewed, it is necessary that display pointer 54 pass over the strobe display 56 without stopping.

Figure 12:
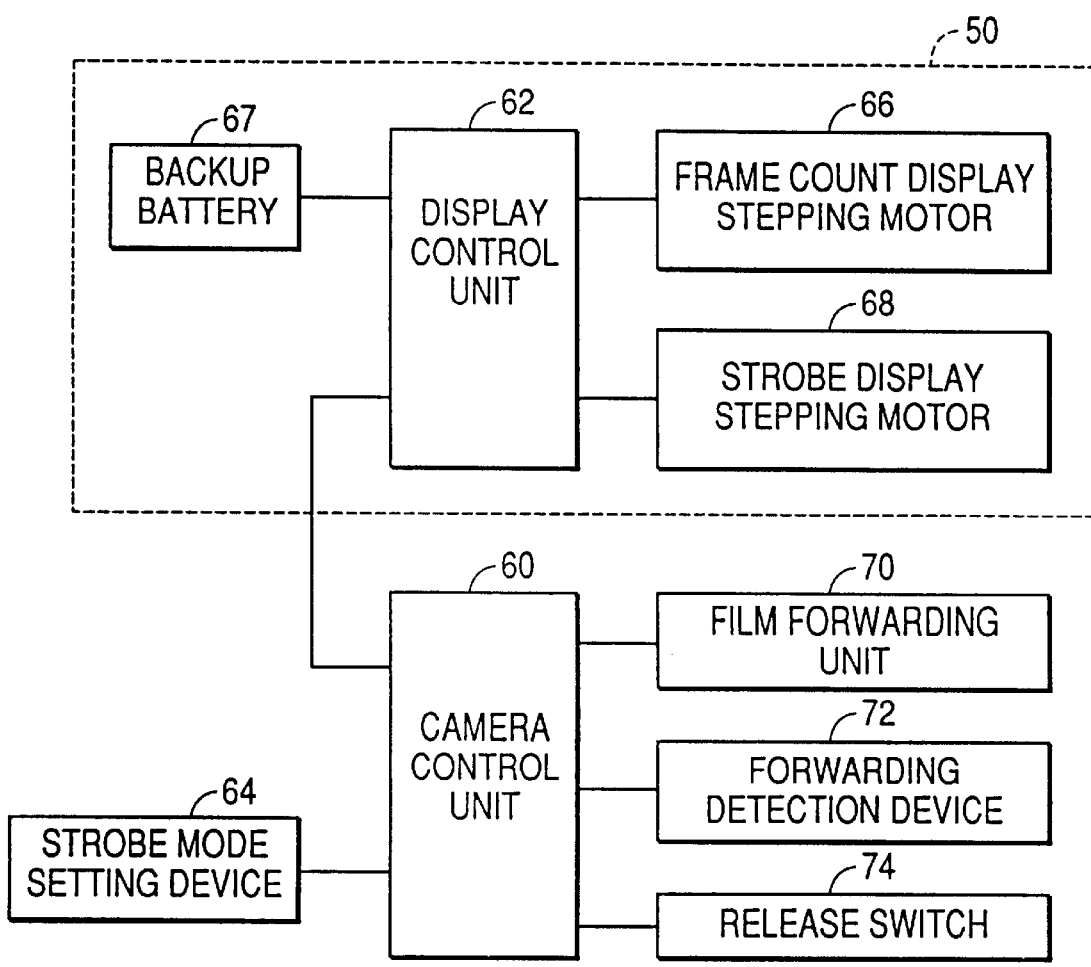
FIG. 12 is a block diagram illustrating a control circuit for controlling the camera display apparatus in accordance with the third embodiment of the present invention.

FIG. 12 is a block diagram of a system for controlling a camera display apparatus according to the third embodiment of the present invention. Camera control unit 60 includes a CPU and controls various operations and sequences of the camera. Display control unit 62 also includes a CPU and controls the movement of the frame count display pointer 54 and the strobe display pointer 58. A strobe mode setting device 64 generates a signal indicating that the camera is in the strobe mode. The signal is input to control unit 60 and sent to display control unit 62 to cause strobe display pointer 58 to be driven to a selected strobe mode display index 57. Film forwarding unit 70 is used to wind film during photography, and forwarding detection device 72 generates a signal which is used to determine whether an end of the film has been reached. Release switch 74 outputs a signal to camera control unit 60 which indicates that the switch 74 has been activated. In display unit 50, frame count display stepping motor 66 is driven by a signal from display control unit 62 in order to rotate frame count display pointer 54. Similarly, strobe display stepping motor 68 is driven by a signal from display control unit 62 in order to rotate strobe display pointer 58. Camera control unit 60 and display control unit 62 store the state of the display device by means of a backup battery 67, even if the camera batteries (not shown in the drawing) are removed.

Figure 13:
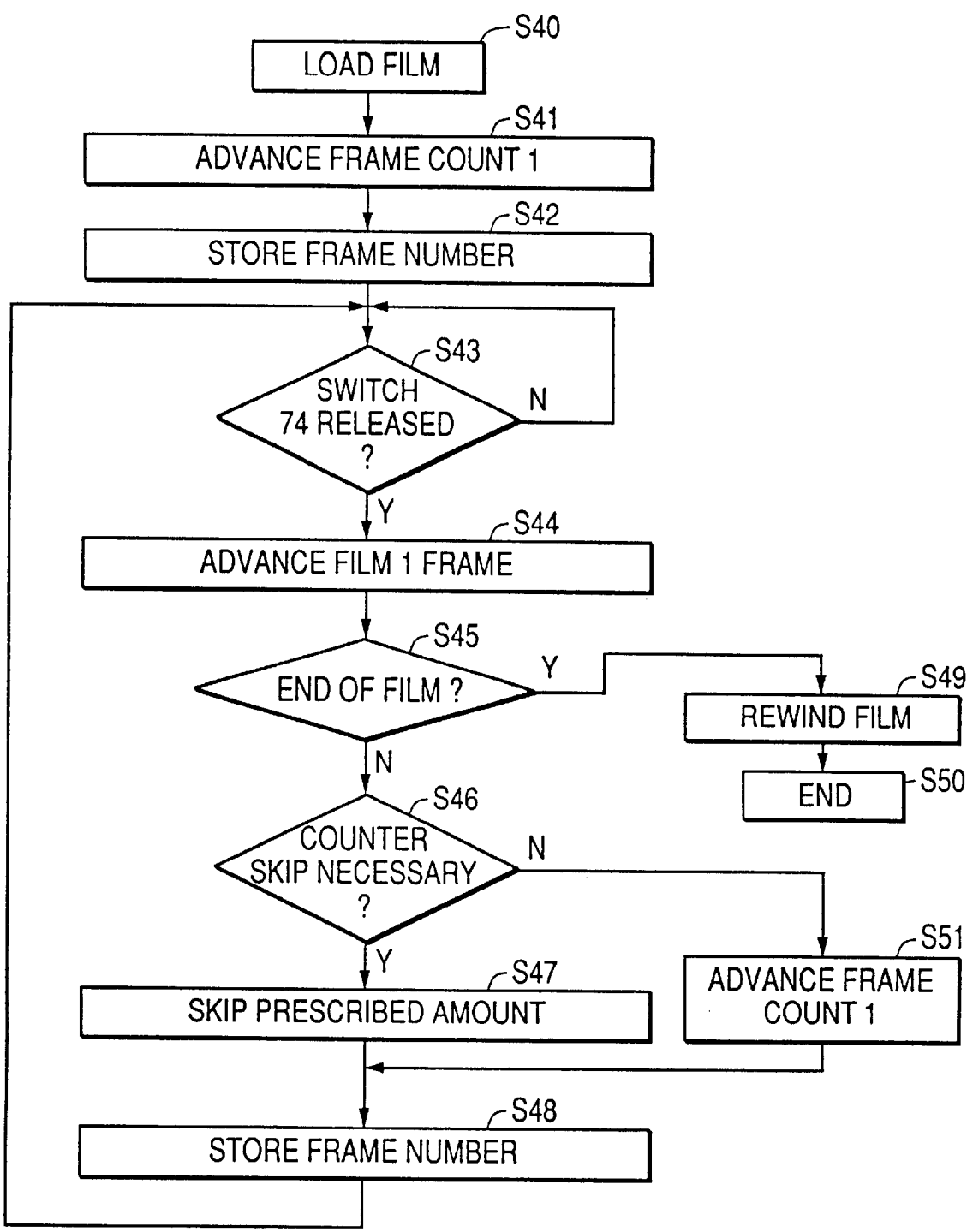
FIG. 13 is a flowchart illustrating a control program for controlling movement of a display pointer in a camera display apparatus in accordance with the third embodiment of the present invention.

FIG. 13 is a flowchart showing an example of a control program for controlling frame count display pointer 54 such that it will not remain stationary when it overlaps the strobe display unit 56. The program begins in step S40 when film is loaded in the camera 10. After execution has begun, in step S41, a signal is output to the film forwarding unit 70 which causes the film to be advanced (i.e., wound) one frame. The signal output to the film forwarding unit 70 is also communicated to display control unit 62 within display unit 50, wherein display control unit 62 outputs a signal to frame count display stepping motor 66 which causes frame count display pointer 54 to move one display index clockwise, thereby advancing the frame count by one. In step S42, the frame count number is stored, and the control program proceeds to step S43. In step S43, an output signal from release switch 74 is monitored, and when it is detected that release switch 74 has been released, the program proceeds to step S44. In step S44, after photography has been performed, a signal is output to the film forwarding unit 70 which causes the film to be advanced (i.e., wound) one frame. Proceeding to step S45, an output signal from the forwarding detection device 72 is detected, and if the signal indicates that the end of the film has not been reached, the program proceeds to step S46. However, if the end of the film is detected, rewinding is performed in step S49 and the program is ended in step S50.

If the end of the film has not been detected in step S45, the program proceeds to step S46 where the frame number stored in step S42 or step S48 is checked to determine whether that frame number is a prescribed frame number. Specifically, the frame number is checked in order to determine whether the frame count display pointer 54 is at a position where it is necessary to advance it past the strobe display 56. When it is determined in step S46 that the prescribed frame number has been detected, the program proceeds to step S47. When the prescribed frame number is not detected, the program proceeds to step S51. In step S47, the control program communicates with display control unit 62 causing display control unit 62 to output a signal to the frame count display stepping motor 66 causing the frame count display pointer 54 to skip a prescribed amount in order to avoid overlapping strobe display unit 56. In step S51, when the prescribed frame count has not been reached, a signal is sent to the frame count display stepping motor 66 which advances frame count by one frame. The program then proceeds to step S48 where the new frame count is stored, and then the program proceeds back to step S43.

Thus, in accordance with the third embodiment of the present invention a smaller display unit may be located within a larger display unit without obstructing the view of the smaller display unit.

Figure 14:
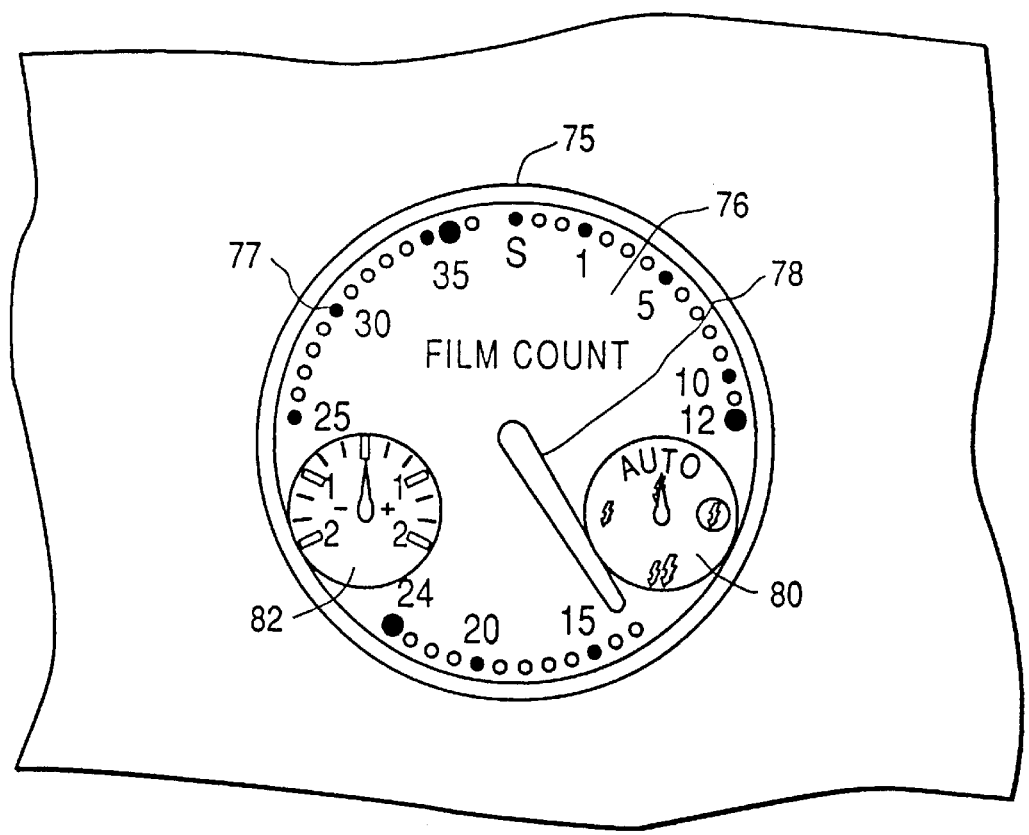
FIG. 14 is an enlarged view of a camera display apparatus in accordance with a modification of the third embodiment of the present invention.

FIG. 14 is an enlarged view illustrating a modification of the camera display apparatus according to the third embodiment of the present invention. A display unit 75 is shown which includes a strobe display unit 80 which displays strobe mode information, an exposure correction display unit 82 which displays an exposure correction amount, and a frame count display unit 76 for displaying frame count.

Frame count display scale 77 has indices "1–36" which are interrupted between 12th and 13th frame count indices by the strobe display unit 80. Furthermore, the frame count indices of display scale 77 are interrupted again between the 24th and 25th indices by the exposure correction display device 82. In order that frame count display pointer 78 does not remain stationary above either the strobe display unit 80 or the exposure correction display unit 82, a drive control method similar to that described above with respect to the control program illustrated in FIG. 13 may be executed. According to this modification of the third embodiment, two counter skips are necessary at the 12th and 24th frame count indices. Further, in this modification of the third embodiment, three stepping motors are required, one for each display unit, and each stepping motor is controlled by a respective control unit. However, control may instead be executed by a single control unit in the camera body. Furthermore, the backup battery 67 may be arranged in the camera body 10 rather than in the display unit 50. Alternatively, a supercapacitor or the like may also be used as a backup energy source. Furthermore, the control states of the camera displayed by means of the display device of this third embodiment are not limited, and they may include such information as the stop failure of the photographic lens, the shutter speed, the distance of the photographic subject and the like.

Figure 15:
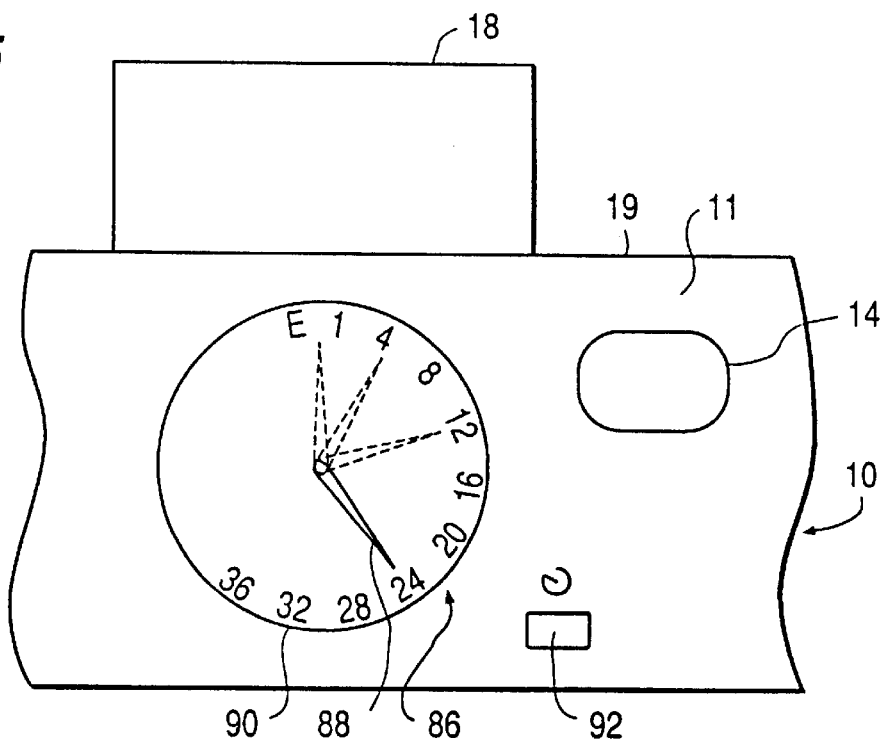
FIG. 15 is a top view of a camera including a camera display apparatus in accordance with a fourth embodiment of the present invention.

FIG. 15 illustrates a fourth embodiment of a camera display apparatus in accordance with the present invention. Like elements in the FIGS. for the first, second, third, and fourth embodiments have like reference numerals. On the top surface 11 of the camera 10 is a display unit 86 for displaying various kinds of photographic information by means of a display pointer 88 which is driven to rotate above a pointer scale 90. The camera further includes a self-timer mode button 92 for placing the camera in a self-timing mode, and release button 14. A photographic lens barrel 18 is located on a front face 19 of camera 10.

Figure 16:
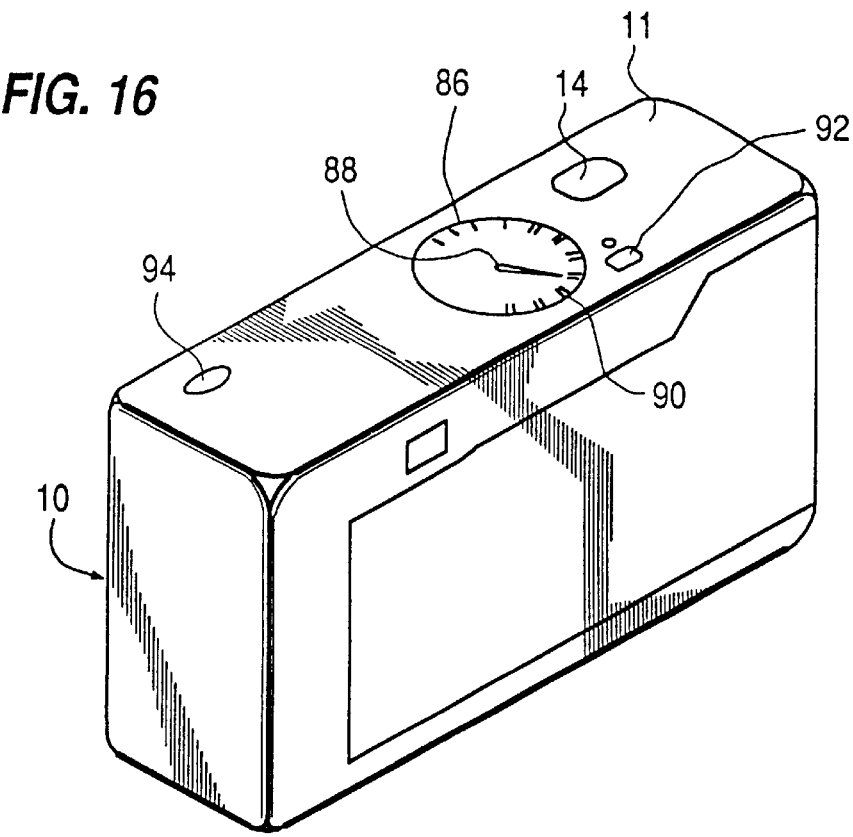
FIG. 16 is a perspective rear view of a camera including the display apparatus in accordance with the fourth embodiment of the present invention.

FIG. 16 is a perspective view of the rear side of camera 10 showing display unit 86 located on the top surface 11 of camera body 10. The display unit 86 displays the photographic frame count during normal photography by means of pointer 88 which rotates about pointer scale 90. A self-timer mode button 92 is also located on the top surface 11 of camera 10. When the self-timer mode is activated, the display unit 86 displays a time until exposure. Additionally, a self-timer display unit 94 and a release button 14 are also disposed on the top surface 11 of camera 10.

Figure 17:
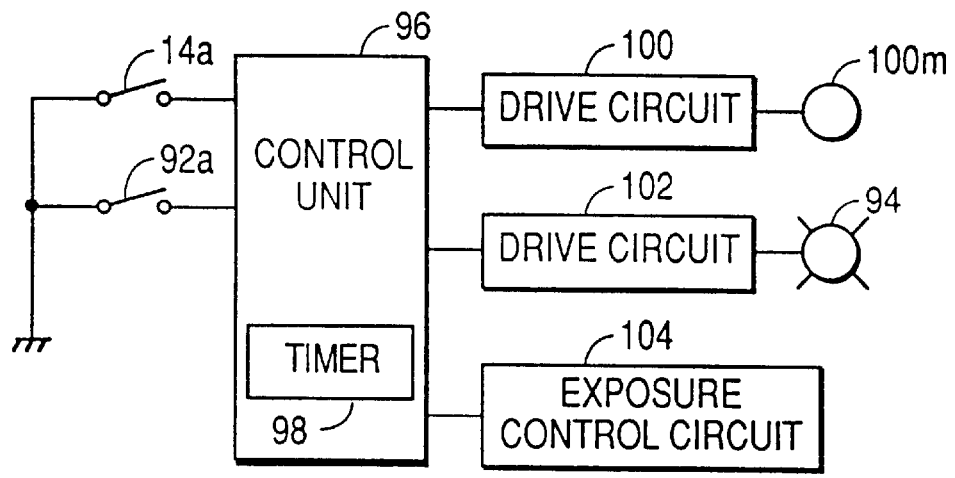
FIG. 17 is a block diagram illustrating a control circuit for controlling a display pointer in a camera display apparatus in accordance with the fourth embodiment of the present invention.

FIG. 17 is a block diagram showing a circuit for controlling the display unit according to the fourth embodiment of the present invention. A control unit 96 which includes a microcomputer, a timer 98 and like peripheral components, receives input signals from switches 14a and 92a. Switch 14a is set ON when release button 14 is depressed, and switch 92a is set ON when the self-timer mode button 92 is depressed. Control unit 96 outputs signals to drive circuits 100 and 102 which drive motor loom and self-timer display unit 94, respectively. Drive circuit 100 sends a signal to motor loom which causes display pointer 88 to rotate. Drive circuit 102 sends a signal to the self-timer display unit 94 causing the display unit to blink indicating that the self-timer display should be reset. Furthermore, an exposure control circuit 104 performs a photographic process by drive control of a shutter mechanism and a stop mechanism, not shown in the drawings.

Figure 18:
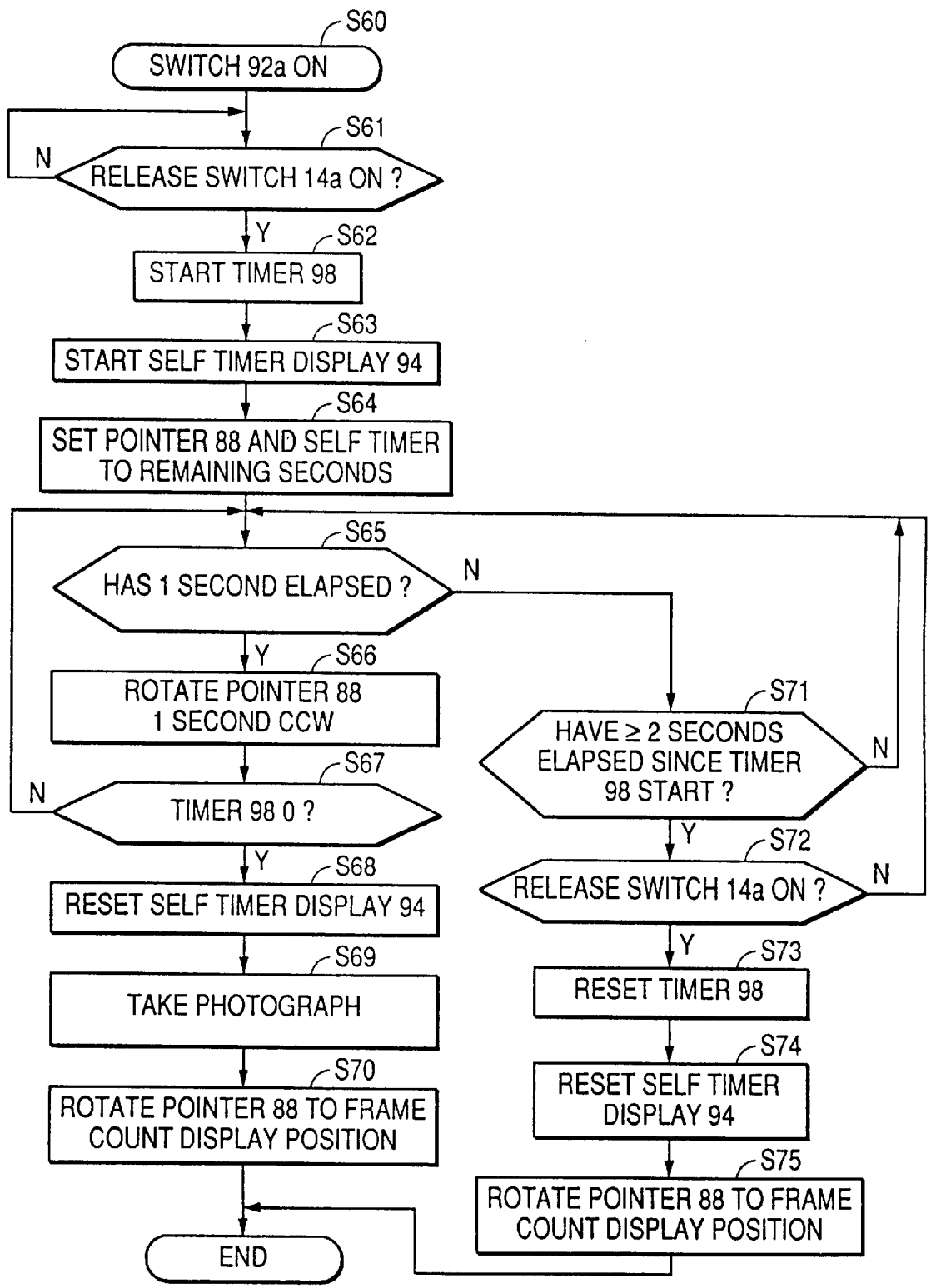
FIG. 18 is a flowchart illustrating a control program for controlling rotation of a display pointer in a camera display apparatus in accordance with the fourth embodiment of the present invention.

FIG. 18 illustrates a flowchart showing an example of a display control program for the camera display apparatus in accordance with the fourth embodiment of the present invention. The control program allows a single rotary pointer to indicate photographic frame count driving a normal mode of operation and timing information during a self-timer mode of operation. Control unit 96 begins execution of the control program in step S60 when the self-timer mode button 92 is depressed and the switch 92a is set ON. After execution has begun, in step S61 it is determined whether or not release has been effected by determining whether release switch 14a is ON. If release has been effected, the program proceeds to step S62 and timer 98 is started at a preset time of 12 seconds. Next, in step S63, self-timer display 94 unit is started, which is indicated by the blinking of the display unit 94. Proceeding to step S64, a signal is sent to drive circuit 100 which causes motor 100m to drive display pointer 88 to a position of a scale mark "12" on the pointer scale 90. The display pointer 88 now indicates the set time of the self-timer. Thus, a change over from a photographic frame count display to self-timer time display has taken place.

Continuing in step S65, it is determined whether or not one second has elapsed. If one second has elapsed, the program proceeds to step S66; and, if one second has not elapsed, the program proceeds to step S71. In step S66, following a determination in step S65 that one second has elapsed, display pointer 88 is rotated one second counter-clockwise to indicate one less second on the self-timer display. Continuing in step S67, it is determined whether or not timer 98 has reached zero. If timer 98 has reached zero, the program proceeds to step S68, however, if timer 98 has not reached zero, the program returns to step S65. In step S68, wherein a determination was previously made in step S67 that the timer 98 has reached zero, a signal is sent to drive circuit 102 in order to stop the blinking of the self-timer display unit 94, thereby indicating the self-timer display has been reset. Continuing in step S69, a photographic process is performed by means of exposure control circuit 104. Upon completion of the photography, the program moves to step S70 and the display pointer 88 is rotated to the former frame count display scale position, which returns the display to the photographic frame count display from the self-timer time display, thereby completing execution of the control program.

However, if the control program branches to step S71 from step S65 then a determination is made in step S71 whether or not two or more seconds have elapsed from the start of the timer 98. According to this embodiment, in order to cancel the self-timer mode, the release button 14 must be pressed a second time after two seconds have elapsed from the time when the self-timer mode was started. If two or more seconds have elapsed, the program proceeds to step S72; however, if the determination in step S72 is negative, the program returns to step S65. In step S72, it is determined by means of switch 14a whether or not release has been effected. If release has been effected, the program proceeds to step S73; however. if release has not been effected the program returns to step S65. Thus, in step S73, wherein it has been previously determined in step S71 that two or more seconds have elapsed since timer 98 was started, and, in step S72 that the release switch 14a is ON, timer 98 will be reset in step S73. Continuing in step S74 the blinking of the self-timer display unit 94 is ended indicating that self-timer display 94 has been reset. Finally, in step S75. the display pointer 88 is rotated to the former photographic frame count display position and the execution of the control program is concluded.

Thus, in the above-described manner, by means of one rotary pointer display unit, a photographic frame count is displayed during normal photography and during a self-timer mode of operation a self-timer is displayed, such that display space is saved and the display can be made smaller in size thereby reducing cost.

Figure 19:
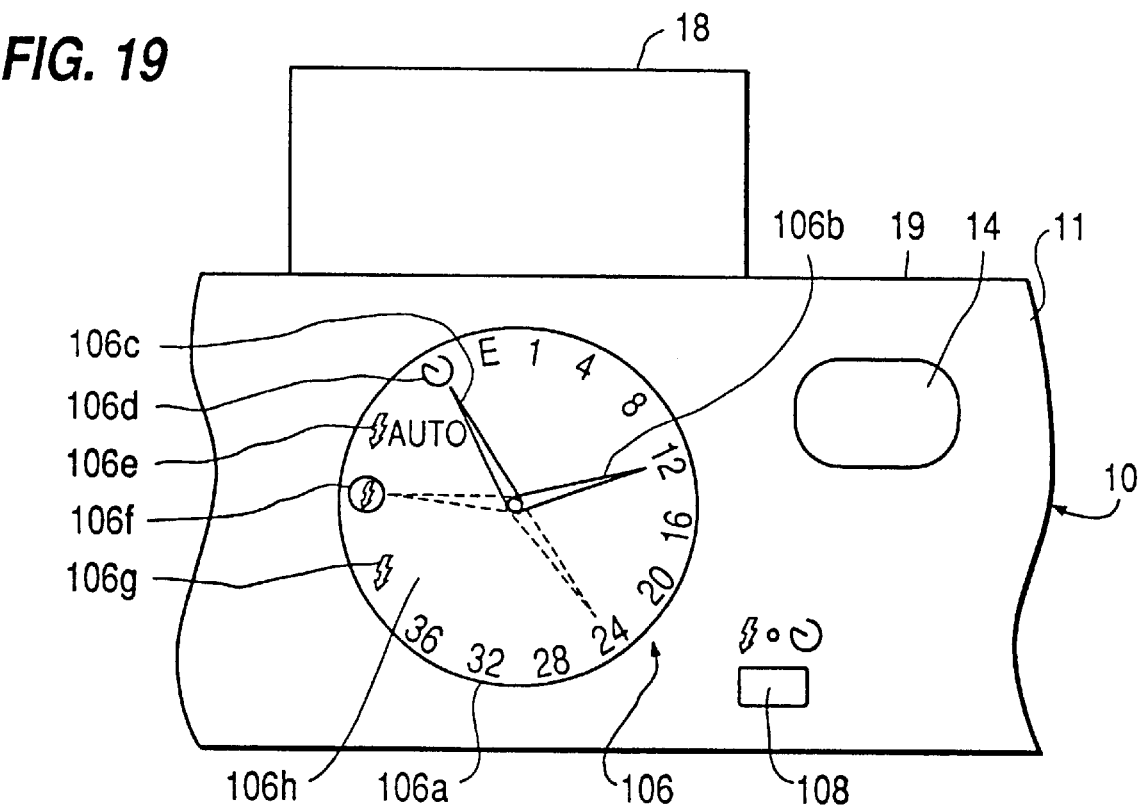
FIG. 19 is a top view of a camera including a display apparatus which is a modification of the fourth embodiment of the present invention.

FIG. 19 shows a modification of a- camera display apparatus according to the fourth embodiment of the present invention. Like elements in the FIGS. have been given the same reference numerals as in the previously described embodiments. FIG. 19 shows arranged on a top surface 11 of the camera body 10 a display unit 106 including two display pointers 106b and 106c which rotate above a pointer scale 106a. During normal photography, a photographic frame count of film is displayed by the pointer 106b, and during a self-timer mode of operation a time until exposure is displayed by display pointer 106b. The display unit 106 includes symbols 106d–106g which indicate various modes of operation. Specifically, symbol 106d on the display pointer scale 106a indicates a self-timer mode of operation; symbol 106e denotes an auto flash mode wherein an amount of light and an illumination angle are automatically adjusted in conjunction with the zooming of a zoom lens (not shown in the drawing); symbol 106f indicates a flash exposure cancel mode; and, symbol 106g denotes a forced light emission mode in which light is forcibly emitted by a strobe (not shown in the drawing). A mode setting button 108 is depressed on order to select one of the modes 106d–g. Upon depression of the mode setting button 108 pointer 106c moves to selected symbols 106d–106g indicating a selected mode, or to a position 106h intermediate between symbol 106g and display scale mark "36". When pointer 106c is set to the intermediate position 106h, the self-timer mode and the flash photography mode are not set, and the normal photographic mode is set. Also located on top surface 11 of camera 10 is a release button 14. A photographic lens barrel 18 extends from the front face 19 of camera 10.

Figure 20:
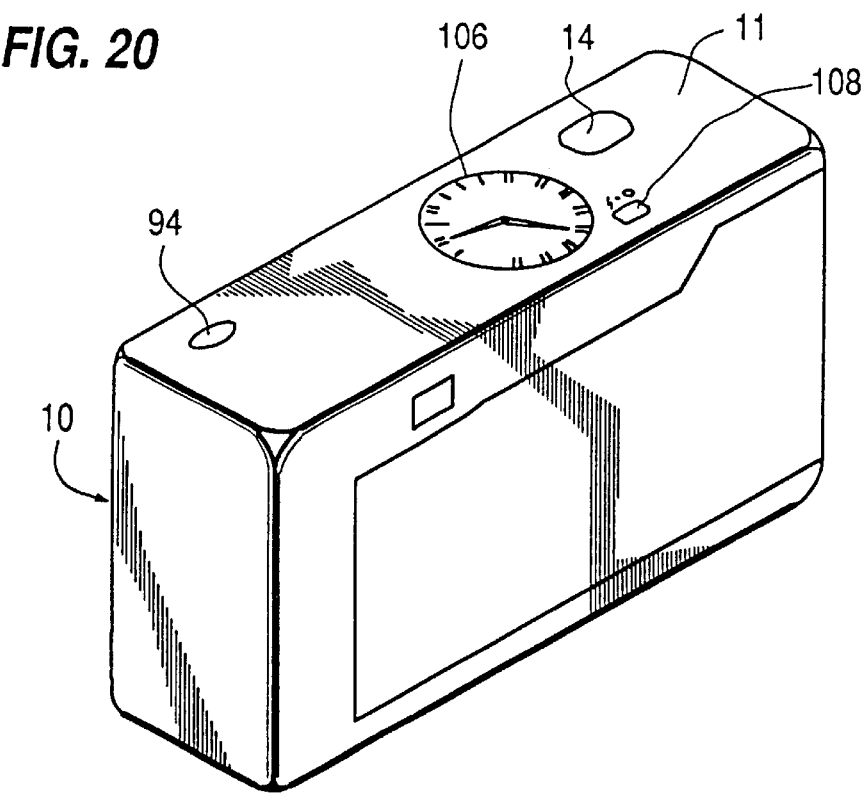
FIG. 20 is a perspective rear view of a camera including a display apparatus in accordance with the modification of the fourth embodiment of the present invention.

FIG. 20 is a perspective rear view showing camera 10 equipped with a display apparatus according to the modification of the fourth embodiment of the present invention. Located on the top surface 11 of camera body 10 are shown mode setting button 108, release button 14, rotary pointer display unit 106, and self-timer display unit 94.

Figure 21:
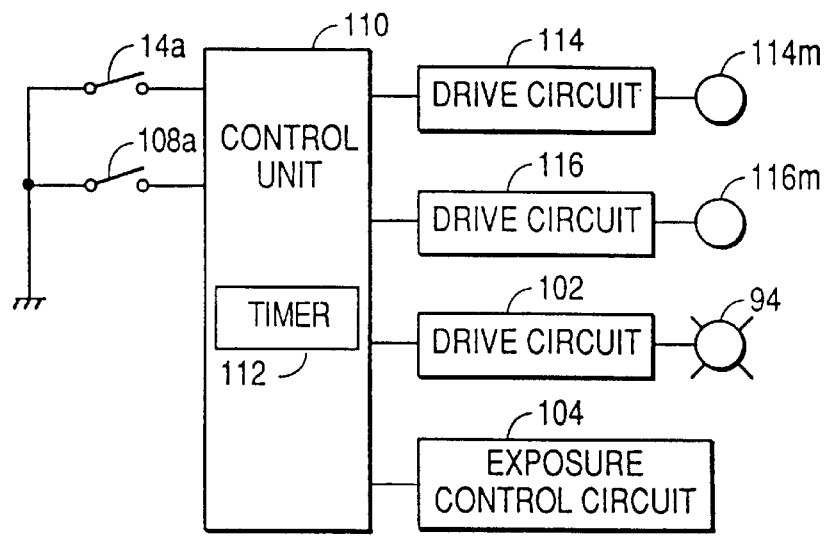
FIG. 21 is a block diagram illustrating circuitry for controlling the display apparatus in accordance with the modification of the fourth embodiment of the present invention.

FIG. 21 is a block diagram of a circuit for controlling the display unit 106 according to this modification of the fourth embodiment of the present invention. Control unit 110 includes a microcomputer and is shown equipped with a timer 112. Control unit 110 performs control of the display unit 106 by executing a display control program described below. Switch 14a is a switch which is set ON when release button 14 is pressed. Further, switch 108a is a switch which is set ON when the mode setting button 108 is pressed. Control unit 110 receives signals from switches 14a and 108a in order to control driving of pointers 106b, 106c. Drive circuit 114 receives signals from control unit 110 to drive motor 114m which causes pointer 106b to rotate. Drive circuit 116 receives signals from control unit 110 in order to cause motor 116m to rotate display pointer 106c. Further, drive circuit 102 is shown for driving self-timer display unit 94, and exposure control circuit 104 is shown for performing a photographic process.

Figure 22A:
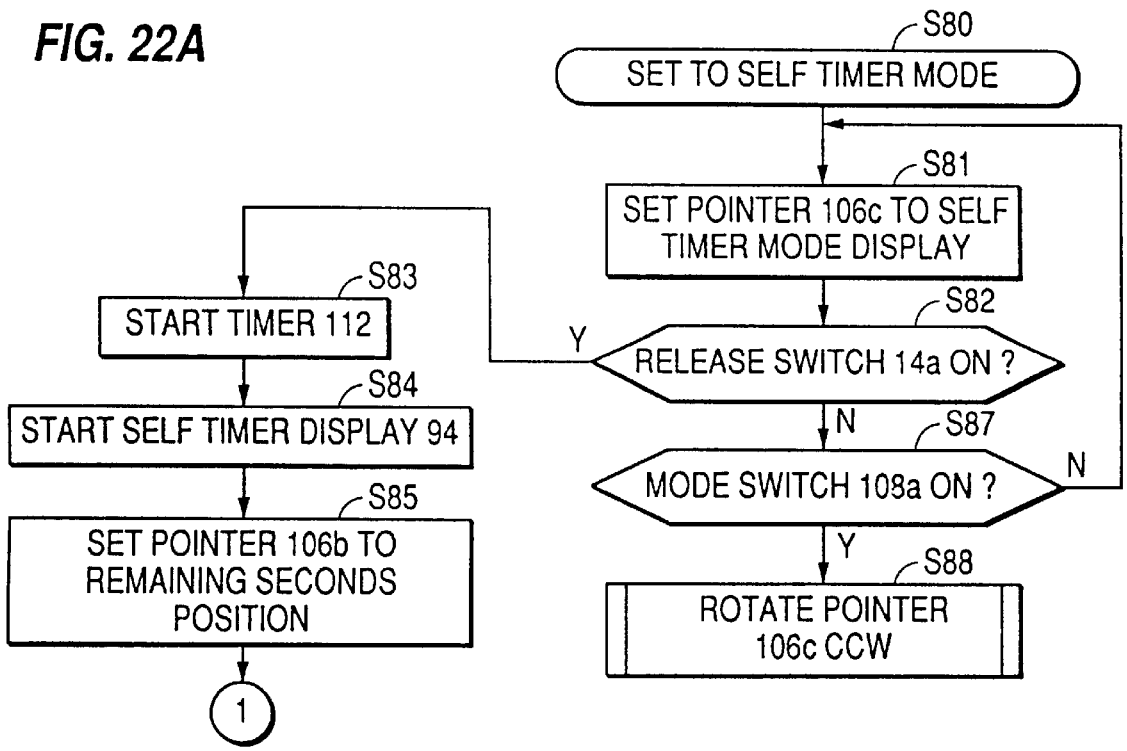
FIGS. 22A and 22B are flowcharts illustrating a control program for controlling a display pointer in a camera display apparatus in accordance with the modification of the fourth embodiment of the present invention.
Figure 22B:
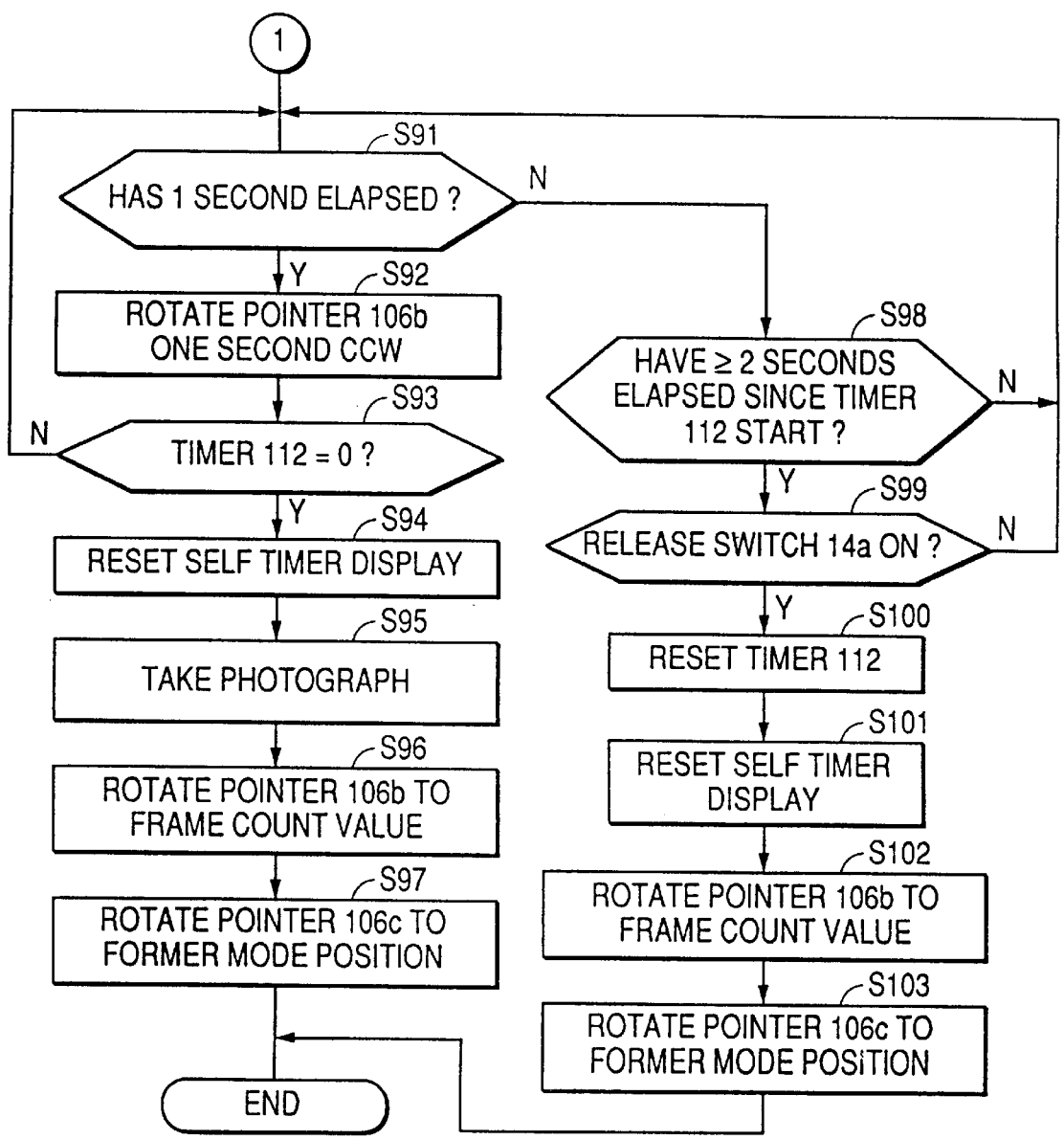

FIGS. 22A and 22B are flowcharts showing an example of a display control program for controlling a display apparatus according to the modification of the fourth embodiment of the present invention. With respect to the description of these flowcharts, "24" will be used as the present photographic frame count.

Control unit 110 starts execution of the control program when the camera 10 is set to a self-timer mode in step S80. After commencement of execution of the control program, in step S81 a signal is output to drive circuit 116 for driving motor 116m which rotates pointer 106c to point to the symbol 106d denoting the self-timer mode. In step S82, it is determined whether or not release has been effected by determining whether switch 14a is ON. If release has been effected, the program proceeds to step S83; however, if release has not been effected the program proceeds to step S87. In step S83, timer 112 is started. In this embodiment, timer 112 has been preset to a time of 12 seconds. The time set in timer 112 decreases accompanying the passage of time. Continuing, in step S84, a signal is sent to drive circuit 102 which starts self-timer display unit 94, and commences the blinking of the self-timer display unit 94. In step S85, drive circuit 114 drives the motor 114m, which rotates pointer 106b to the scale position 12 on the pointer scale 106a, indicating a set time of 12 seconds for the self-timer. Thus, the previous steps have changed the display from the frame count display to the self-timer display.

Next, in step S91 shown in FIG. 22B, it is determined whether or not one second has elapsed. If one second has elapsed, the program proceeds to step S92; however, if one second has not elapsed, the program proceeds to step S98. In step S92, pointer 106b is driven by motor 114m to rotate the pointer 106b one second in a counterclockwise direction. Continuing in step S93, it is determined whether or not the timer 112 has reached zero, and therefore the self-timer mode is complete. If the timer 112 has reached zero, the program proceeds to step S94; however, if the timer 120 has not reached zero, the program returns to step S91. In step S94, a signal is sent to drive circuit 102 which resets the self-timer causing the blinking of the self-timer display unit 94 to stop. Continuing in step S95, the photographic process is performed by means of the exposure control circuit 104. After the conclusion of photography in step S95, in step S96 the pointer 106b is rotated to its former position indicating a photographic frame count. Further, in step S97, after having ended the self-timer time display mode, the pointer 106c rotates to a former photographic mode position, and the execution of the control program is concluded.

However, when it has been determined in step S91 that one second has not elapsed, the program proceeds to step S98 where a determination is made as to whether two or more seconds have elapsed from the start of the self-timer mode. This determination is made since, according to this embodiment example, in order to cancel the self-timer mode after two or more seconds have elapsed, the release button 14 has to be pressed a second time. If two or more seconds have elapsed, the program proceeds to step S99, and if not, the program returns to step S91. In step S99, it is determined by means of switch 14a whether or not release switch 14a is set ON. If release switch 14a is set ON, the control program proceeds to step S100; however, if release switch 14a is not set ON, the program returns to step S91. In step S100, the timer 112 is reset, and continuing, in step S101 the self-timer display unit 94 is reset and its blinking is stopped. Further, in step S102 the pointer 106b is rotated to the former scale position 24 indicating frame count value. Finally, in step S103 the pointer 106c rotates to a former photographic mode position, and the execution of the control program is concluded.

Returning to step S82 of FIG. 22A, when release has not been effected, the program proceeds to step S87 wherein it is determined by means of mode setting switch 108a whether or not the mode setting button 108 has been depressed. If the mode setting button has been depressed the program proceeds to step S88; however, if the mode setting button has not been depressed, the program returns to step S81. In step S88 the pointer 106c is rotated counterclockwise and moves to the symbol position denoting the flash photography mode wherein a routine for processing this mode (not illustrated) is executed.

Thus, according to the modification of the fourth embodiment of the display apparatus according to the present invention, two pointers 106b and 106c are arranged on a rotary pointer type of display unit. During normal photographic mode, the pointer 106b displays the photographic frame count, and during a self-timer mode the self-timer time is displayed by the pointer 106b.

Figure 23:
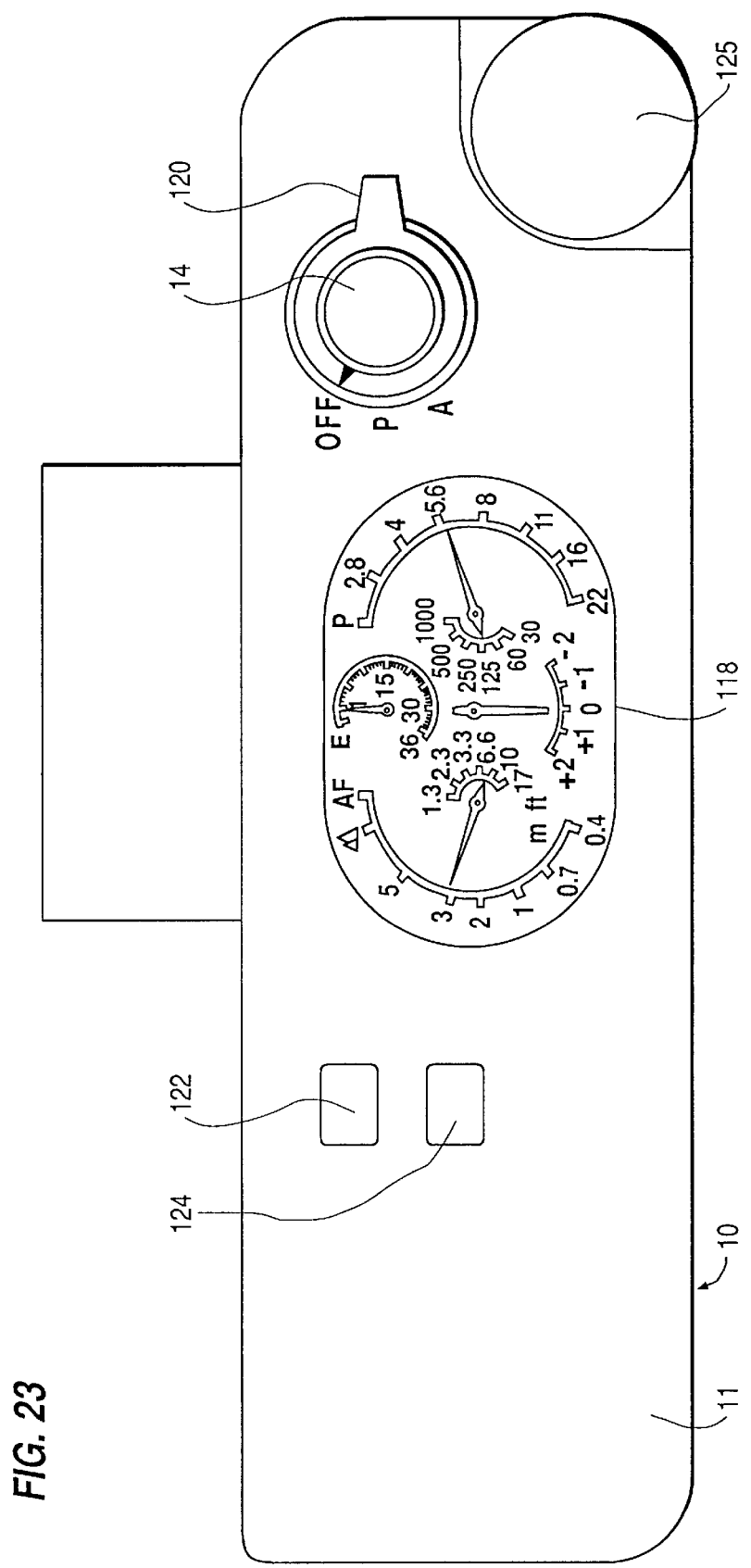
FIG. 23 is a top view of a camera including a display apparatus in accordance with a fifth embodiment of the present invention.
Figure 26:
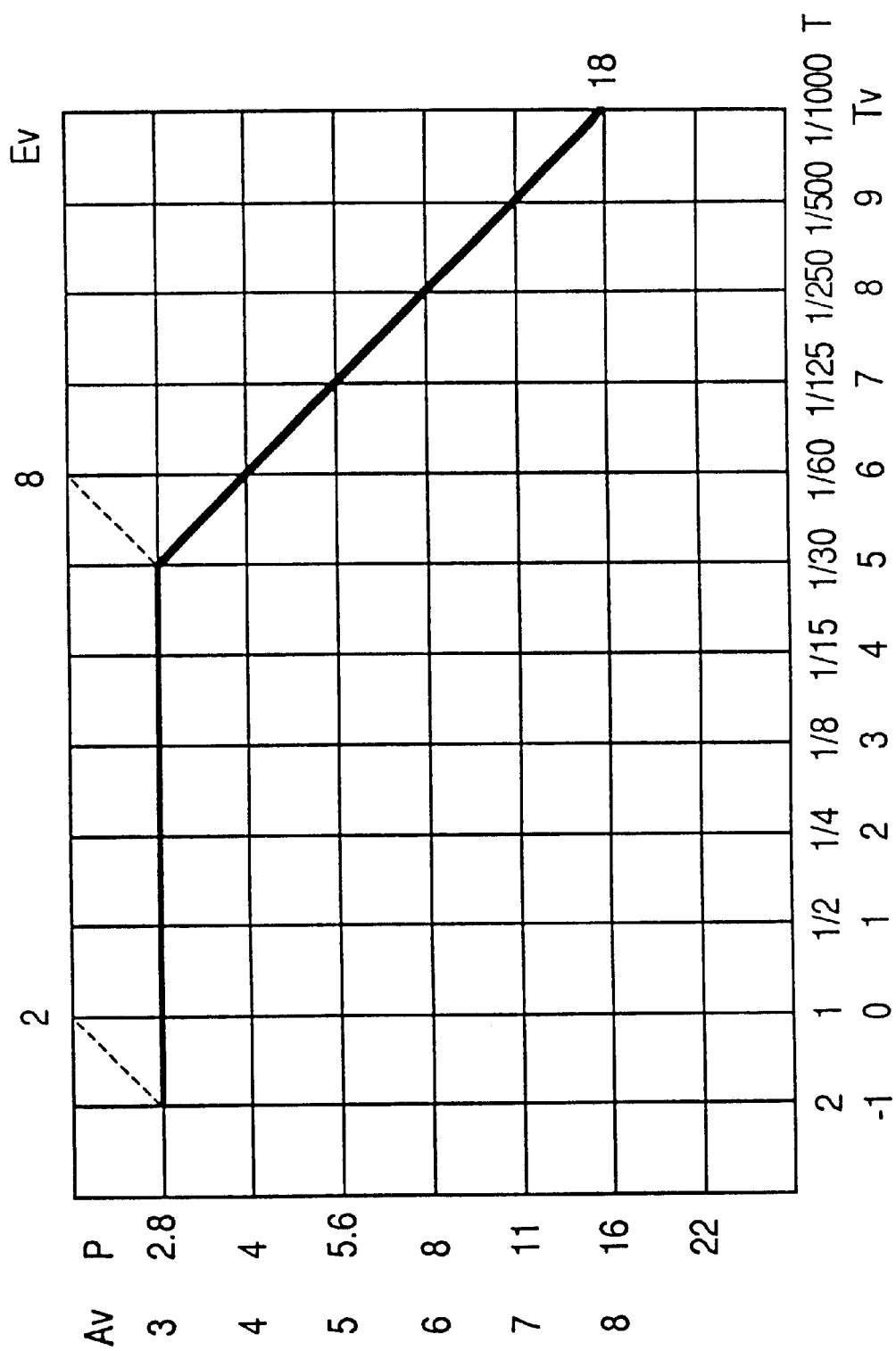
FIG. 26 is a program chart which is stored in a camera having a display apparatus in accordance with the fifth embodiment of the present invention.

FIG. 23 shows a fifth embodiment of a camera display apparatus according to the present invention. Like elements in the FIGS. for the first, second, third, fourth, and fifth embodiments have like reference numerals. As shown in FIG. 23, on a top surface 11 of a camera body 10 are a release button 14, a photographic mode selection lever 120, a manual focus mode button 122, an exposure correction button 124, a command dial 125, and, a display unit 118. Photographic mode selection lever 120 includes two modes "P" and "A". When the lever 120 is set to the "P" index, the program mode is set. In this mode, stop and shutter are automatically set according to the brightness of the subject in accordance with the program chart shown in FIG. 26. When the photographic mode selection lever is set to "A", the stop priority mode is set and an optional stop value may be set by means of command dial 125. When the selection lever is set to the index OFF, the operation of the camera is stopped.

Figure 24:
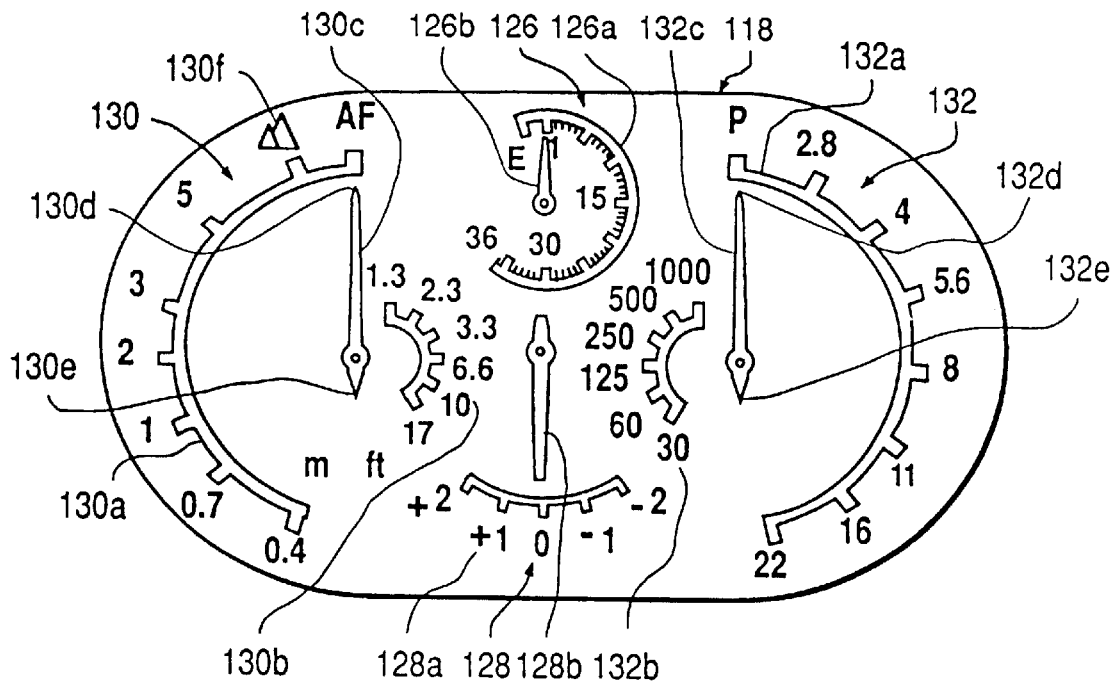
FIG. 24 is an enlarged view of the camera display apparatus in accordance with the fifth embodiment of the present invention.

FIG. 24 is an enlarged view of display unit 118 which includes a plurality of display scales to display photographic information. A plurality of display pointers are also provided which have plural indication ends for indicating plural information on the different scales. More specifically, display unit 118 includes a photographic frame count display portion 126, an exposure correction display portion 128, a range display portion 130, and a stop display portion 132. The photographic frame display portion 126 displays a photographic frame count by means of a rotary pointer 126b indicating values on a pointer scale 126a. The exposure correction display portion 128 displays an exposure correction value by means of a rotary pointer 128b on a pointer scale 128a. The range display portion 130 includes a range scale 130a, in units of meters, a range scale 130b in units of feet, and a pointer 130c. One end 130d of the pointer 130c indicates in units of meters on range scale 130a, and another end 130e of pointer 130c indicates in units of feet on the range scale of 130b. Furthermore, AF on scale 130a denotes the autofocus mode, and the symbol referenced by 130f denotes infinity.

The stop display portion 132 includes a scale 132a showing the stop value, a scale 132b indicating the shutter speed, and a pointer 132c having plural indicating ends 132d and 132e. One indication end 132d of the pointer 132c serves to point to values on the stop scale 132a. The other indication end 132e indicates shutter speed on the shutter speed scale 132b.

Figure 25:
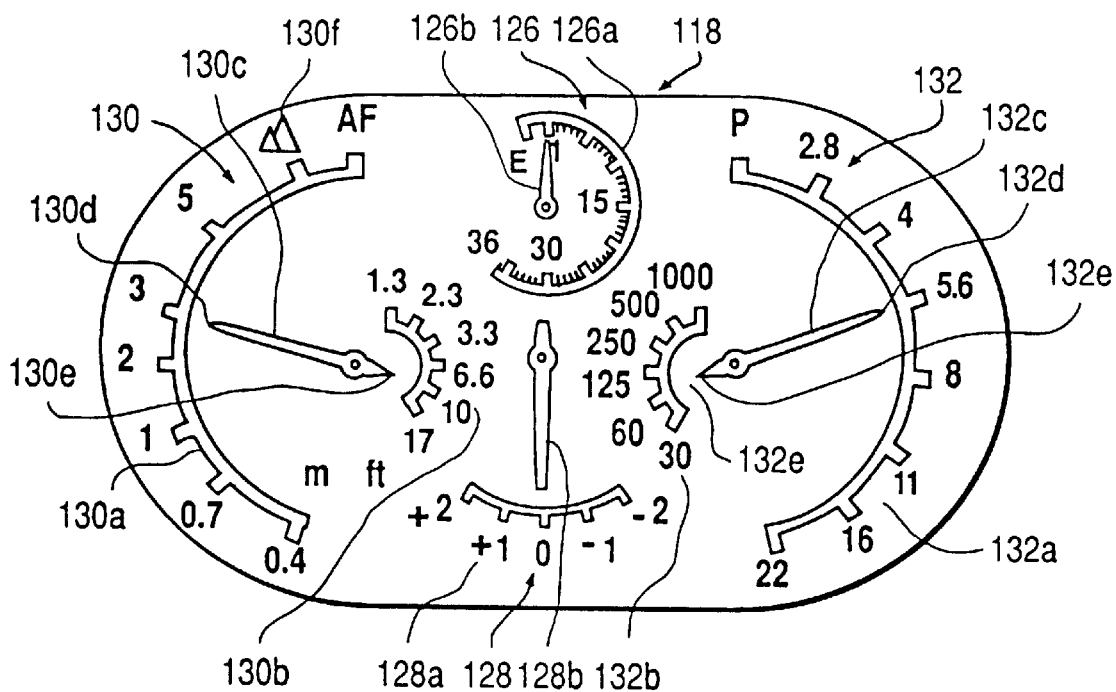
FIG. 25 is an enlarged view of the camera display apparatus in accordance with the fifth embodiment of the present invention.

FIG. 25 illustrates an example of operation of the display apparatus according to the fifth embodiment of the present invention. The photographic frame count display unit 126 includes a pointer 126b which is driven to rotate by a stepping motor (not shown in the drawing) to a point on scale 126a indicating the present photographic frame count. Further, the exposure correction display portion 128 is operated when the command dial 125 is rotated while the exposure correction button 124 is depressed. The pointer 128b is rotated by a stepping motor (not shown in the drawing) according to the direction of rotation and the amount of rotation of the command dial 125. The exposure correction display pointer 128b indicates a stop correction value on the exposure correction scale 128a.

The range display portion 130 is operated when the camera 10 is in an autofocus mode according to the focusing distance determined by a range finder device (not shown in the drawing). Pointer 130c is driven to rotate by a stepping motor (not shown in the drawing) in order to indicate photographic range on the scale 130a in units of meters, and indicate the photographic range in units of feet on the scale 130b. Specifically, the indication end 130d of the pointer 130c points to the photographic range scale 130b which is in units of feet, and an opposite end 130e of pointer 130c points to the photographic range scale 130b which is in units of meters. As seen in FIG. 25, a photographic range of 3 meters is indicated by indication end 130d on scale 130a, and a photographic range of 10 feet is indicated by indication end 130e on scale 130b.

Furthermore, during a manual focusing mode, set by the depressing the manual focus button 122, when the command dial 125 is rotated, the pointer 130c is set to an optional photographic range. The pointer 130c is driven to rotate according to the direction of rotation and amount of rotation of the command dial 125. The photographic range is then indicated, similar to the autofocus mode, on the scale 130a in units of meters by the indication end 130d of pointer 130c, and the photographic range is indicated in units of feet on the scale 130b by the other indication end 130e of pointer 130c.

During the program mode, when the photographic mode selection lever 120 is set to P the stop display portion 132 is driven according to the photometric value determined by a photometer device (not shown in the drawing), and the stop display pointer 132c is driven to rotate by a stepping motor (not shown in the drawing). The photometric value determined by the photometer device is indicated on the scale 132a by one indication end 132d of the pointer 132c, and the shutter speed is indicated on the scale 132b by the other indication end 132e of pointer 132c. The shutter speed indicated on scale 132b is a value corresponding to the photometric value indicated by the indication end 132d on scale 132a. Corresponding values of photometric value shutter speed are determined from a program chart shown in FIG. 26. According to the display apparatus example shown in FIG. 25, a photometric value of F5.6 is indicated by indication end 132d of pointer 132c. As seen in the program chart of FIG. 26, a photometric value of F5.6 indicated on the Y axis of the program chart corresponds to a shutter speed of 1/125, as indicated on the X axis of the program chart. Accordingly, the indication end 132e of stop display pointer 132c points to this value on the shutter speed scale 132b.

Furthermore, when a stop priority mode is set by placing the photographic mode selection lever at the index A, an optional stop value is set by means of the command dial 125. When the command dial 125 is rotated, pointer 132c is driven to rotate according to the direction of rotation and the amount of rotation of the command dial 125, thereby setting an optional stop value. In this mode, indication end 132d of the pointer 132c indicates the stop value on the scale 132a.

In the above-described manner, the simultaneous display of plural photographic information is achieved. Specifically, an indication of range in units of feet and in units of meters may be displayed at the same time on one rotary pointer type of display unit. Furthermore, the stop value and the shutter speed are also displayed simultaneously by means of a display apparatus according to the fifth embodiment of the present invention. The simultaneous display of information allows the display device of a camera to be reduced in size, and therefore its costs can be reduced.

Although the fifth embodiment of the present invention has been described with respect to a simultaneous display of range information and stop and shutter speed information, the information which is indicated by respective indication ends of the pointers is not limited by the above-described embodiment. Furthermore, although a straight pointer is used in the display of the above-described embodiment, a curved pointer having plural indication ends may be used. Additionally, a pointer may be used which is specially arranged with three or more indication ends, wherein a respective different type of photographic information is displayed by each indication end.

Figure 27:
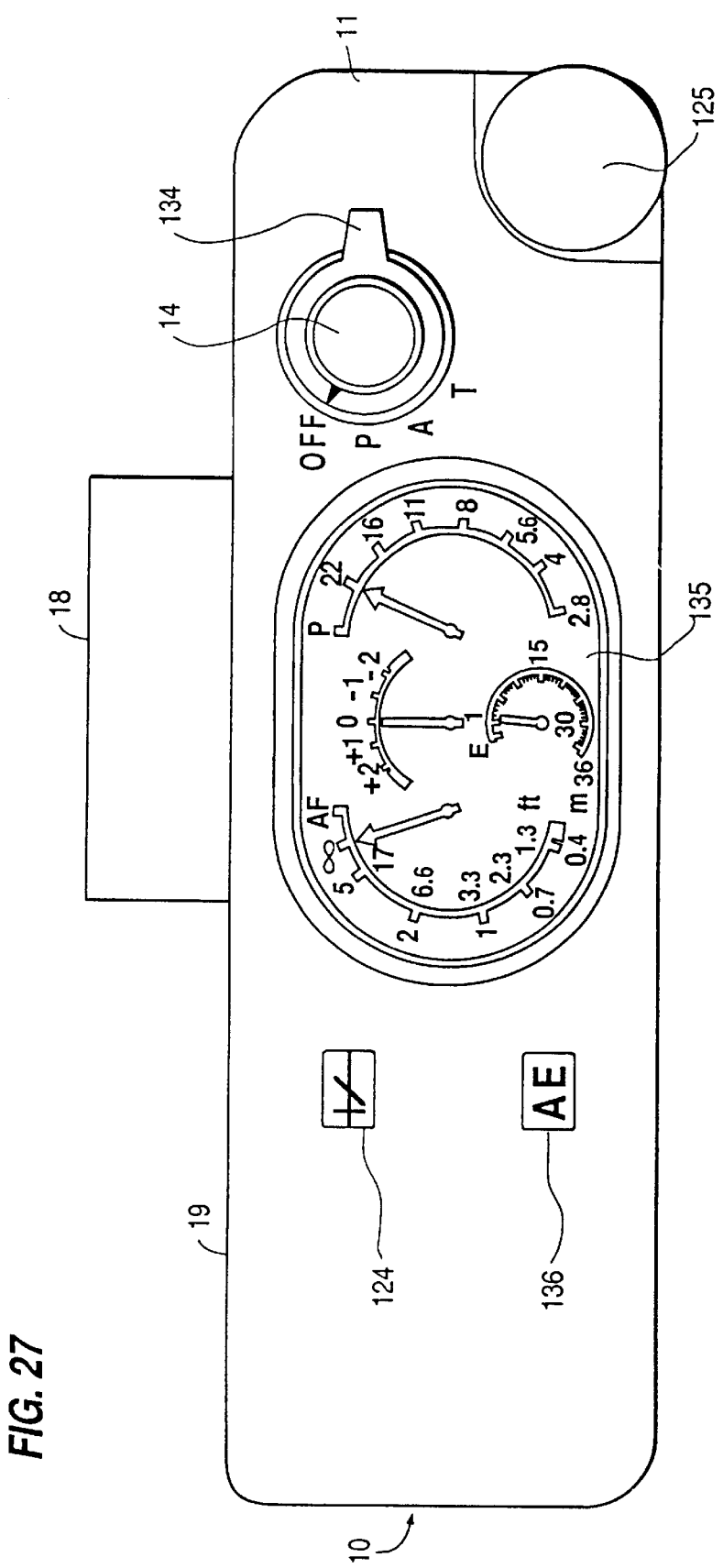
FIG. 27 is a top view of a camera including a display apparatus in accordance with a sixth embodiment of the present invention.

FIG. 27 is a top view of a camera equipped with a display apparatus according to a sixth embodiment of the present invention. Like elements in the FIGS. for the first, second, third, fourth, fifth and sixth embodiments have like reference numerals. Located on the top face 11 of the camera 10 are a release button 14, an exposure mode selection lever 134, a display unit 135, an autofocus (termed "AF" hereinbelow) mode button 136, an exposure correction button 124, and a command dial 125. Also, a photographic lens barrel 18 extends from front face 19 of camera 10.

The exposure mode selection lever 134 includes four index settings as indicated by the indices "P", "A", "T" and "OFF" shown in FIG. 27. When the exposure mode selection lever 134 is set to P, the program mode is set and the stop and shutter speed of the camera 10 are set, according to the program chart shown in FIG. 31, in proportion to a brightness of the photographic subject as described below. When the exposure mode selection lever 134 is set to A, an optional stop value can be set by means of the command dial 125. Furthermore, when the exposure selection lever 134 is set to T, a shutter speed priority mode is set, and an optional shutter speed can be set by means of the command dial 125. Finally, when exposure mode selection lever 134 is set to the index OFF, the operation of the camera is stopped.

Figure 28A:
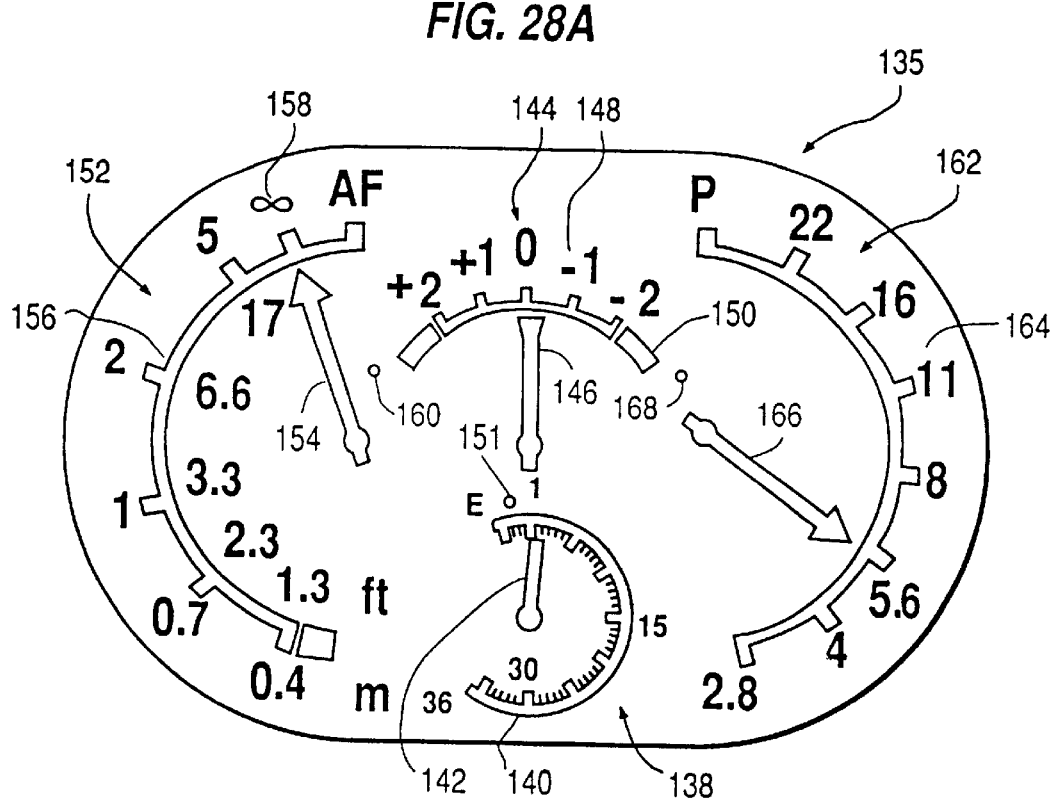
FIG. 28A is an enlarged view of the display apparatus in accordance with the sixth embodiment of the present invention.

FIG. 28A shows an enlarged view of the display unit 135. Display unit 135 includes a photographic frame count display unit 138, an exposure correction display unit 144, a focus set range display unit 152, and a stop display unit 162. The photographic frame count display unit 138 displays a photographic frame count by means of a pointer 142 which rotates above a scale 140 indicating a frame count. The exposure correction display unit 144 displays an exposure correction value by means of a pointer 146 which rotates above a scale 148 indicating a correction value. Moreover, index 150 on scale 148 warns of an interlock limit during program shift, and a limit stop 151 limits the rotation of pointer 146. The focus set range display unit 152 displays a focus set range by means of a pointer 154 which rotates above a scale 156 showing the range in units of meters and in units of feet. Furthermore, an index 158 denotes infinity, and a stop 160 limits the rotation of the focus set range display pointer 154. The stop display unit 162 displays a stop value by means of the pointer 166 which rotates above a scale 164 indicating a stop value. A stop 168 limits the rotation of the pointer 166.

Figure 28B:
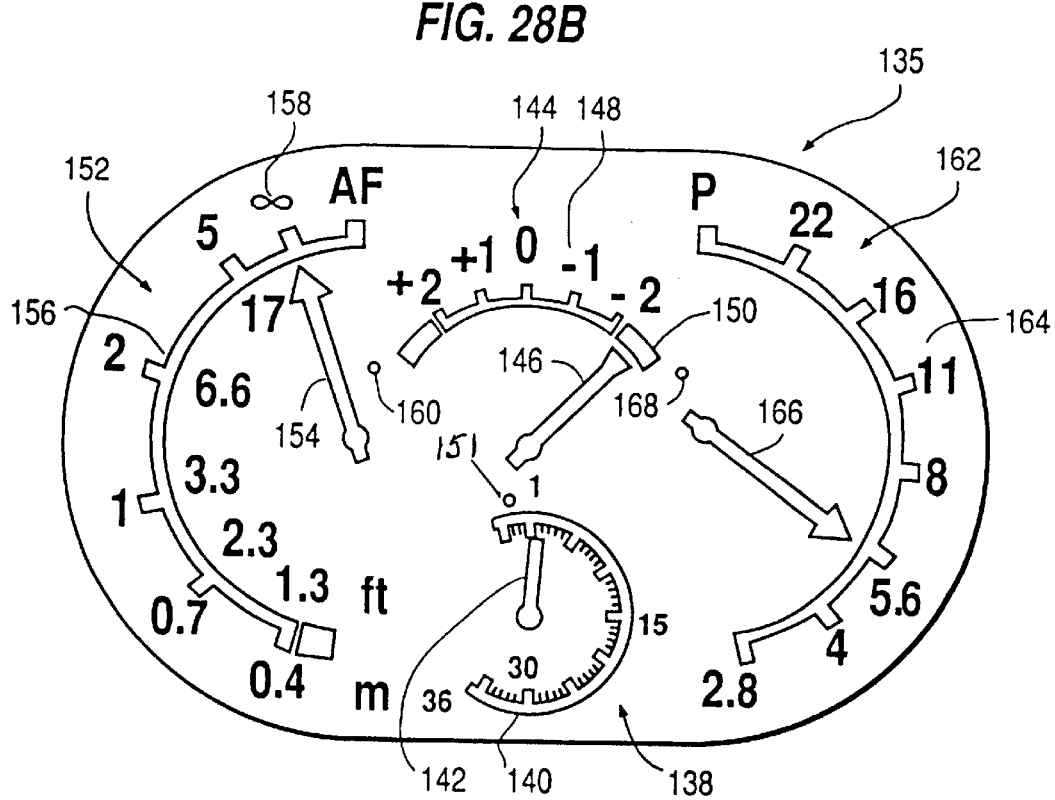
FIG. 28B is an enlarged view of the display apparatus in accordance with the sixth embodiment of the present invention.

FIG. 28B is an enlarged view of the display unit 135 showing the display when the interlock limit has been reached beyond which the shutter speed cannot be increased. The stop value pointer 166 indicates a stop value 4; the focus set range pointer indicates infinity; and the exposure correction display pointer 146 points to index 150 indicating a warning that the shutter speed has reached the interlock limit.

Figure 29:
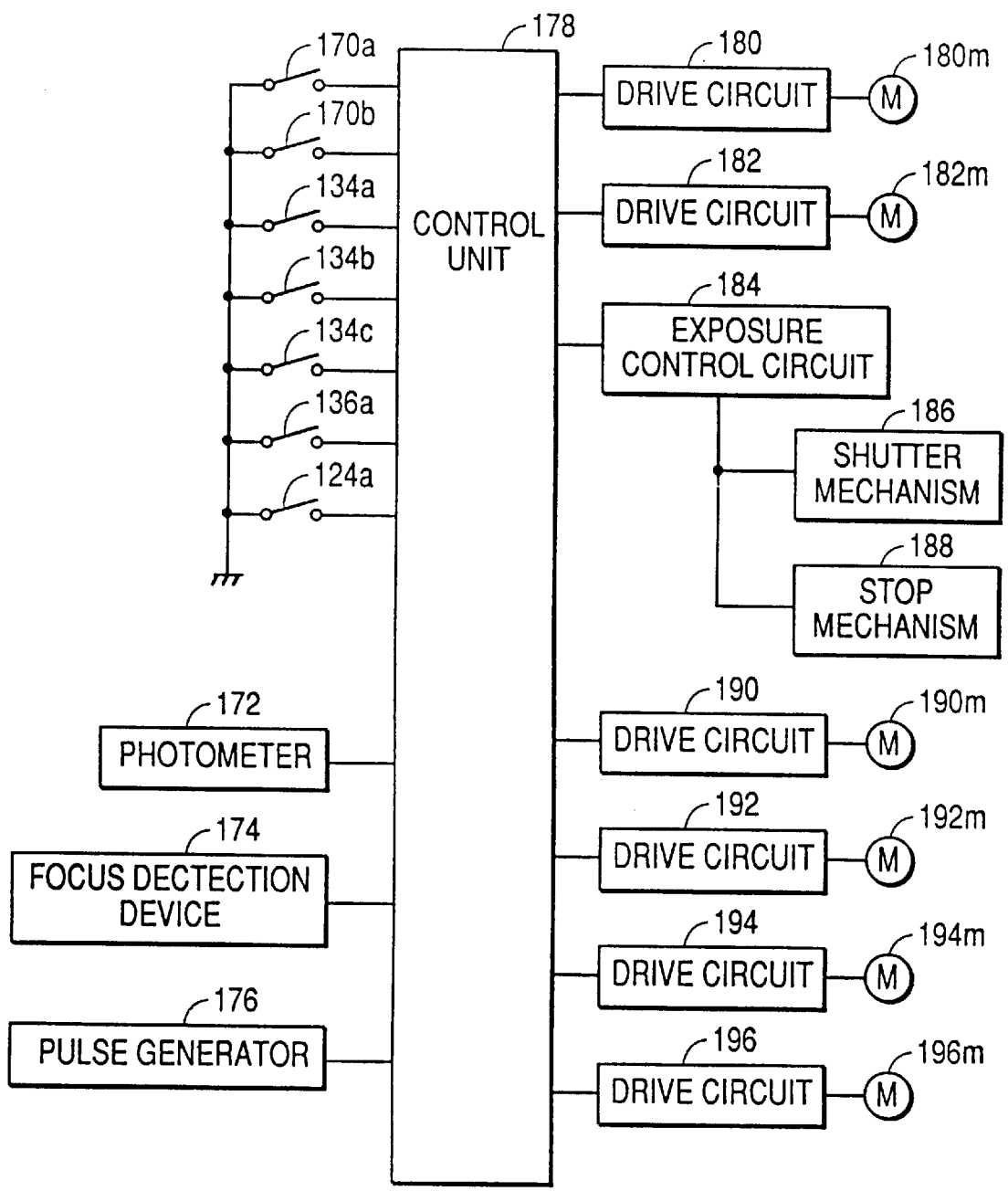
FIG. 29 is a block diagram of control circuitry for controlling a camera display apparatus in accordance with the sixth embodiment of the present invention.

FIG. 29 is a block diagram of a circuit for controlling the operation of display unit 135. Control unit 178 includes a microcomputer and its peripheral components and performs camera sequence control and various calculations, and in addition performs display control by executing the control program as described below. A set of switches is connected to control unit 178 and the state, ON or OFF, of those switches corresponds to the state of corresponding control buttons and selection levers. Specifically, switch 170a is set ON when the release button 14 is half depressed, and switch 170b is a switch which is ON when the release button 14 is fully depressed. Switch 134a is a switch which is set ON when the exposure mode selection lever 134 is set to the program mode P; switch 134b is set ON when the exposure mode selection lever 134 is set to the stop priority mode A; and, switch 134c is set ON when the exposure mode selection lever 134 is set to the shutter speed priority mode A. Switch 136a is a switch which is ON when the AF mode button 136 is depressed, and switch 124a is a switch which is ON when the exposure correction button 124 is depressed.

A photometer device 172 is provided for detecting the brightness of a photographic subject. Focus detection device 174 detects the state of focus adjustment of the photographic lens, and a pulse generator 176 which generates pulse signals in proportion to the amount of rotation and direction of rotation of command dial 125. Drive circuit 180 drives film advance motor 180m. Drive circuit 182 drives a photographic lens motor 182m. Exposure control circuit 184 controls a shutter mechanism portion 186 and stop mechanism portion 188. Furthermore, a drive circuit 190 controls a stepping motor 190m which drives the rotation of frame count display pointer 142. A drive circuit 192 controls a stepping motor 192m which drives the rotation of exposure correction display pointer 146. A drive circuit 194 controls a stepping motor 194m which drives the rotation focus set range pointer 152. 196 is a drive circuit for a stepping motor 196m which drives the rotation stop value pointer 166.

When photography is performed, control unit 178 controls the film advance motor drive circuit 180, and winds the film 1 frame by means of the film advance motor 180m. In addition, the frame count display pointer 142 is rotated one frame under the control of the frame count display pointer drive circuit 190, which drives stepping motor 190m. Furthermore, when the photography has been completed, the control unit 178 controls the film advance drive circuit 180, to rewind the film into a cartridge, and in addition, controls the frame count display drive circuit 190 to set the frame count display pointer to the index "E" by means of stepping motor 190m.

When the exposure correction button 124 is depressed and the switch 124a is ON, the control unit 178 controls the drive circuit 192 to drive the stepping motor 192m to rotate exposure correction pointer 146 in proportion to the amount of rotation and direction of rotation of the command dial input from the pulse generator 176.

During the AF mode, when the release button 14 is depressed and the switch 14a is ON, the control unit 178 performs focus detection by means of the focus detection device 174 and controls the photographic lens drive circuit 182 to drive the photographic lens drive motor 182m, thereby moving the photographic lens to a position in proportion to a photographic range which results from the focus detection.

When the AF mode button 136 is depressed and the switch 136a is ON, the control unit 178, controls the drive circuit 194 and drives the stepping motor 194m, to rotate the focus set range pointer 154 in proportion to the amount of rotation and direction of rotation of the command dial 125 input from the pulse generator 176. Additionally, control unit 178 controls the drive circuit 182 to drive the photographic lens drive motor 182m, moving the photographic lens to a position in proportion to the photographic range displayed by the focus set range display unit 152.

Figure 30:
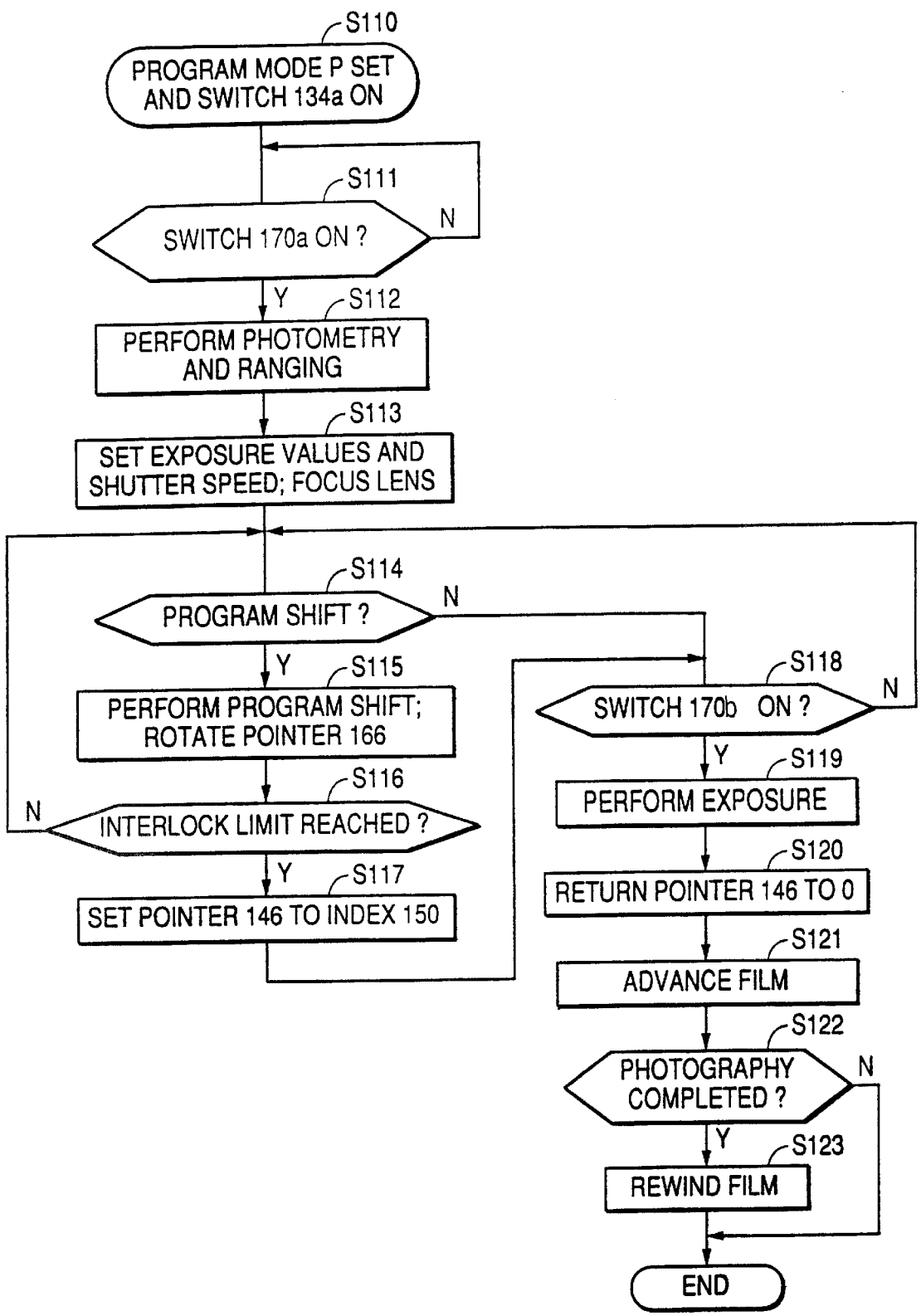
FIG. 30 is a flowchart illustrating a control program for controlling a camera display apparatus in accordance with the sixth embodiment of the present invention.
Figure 31:
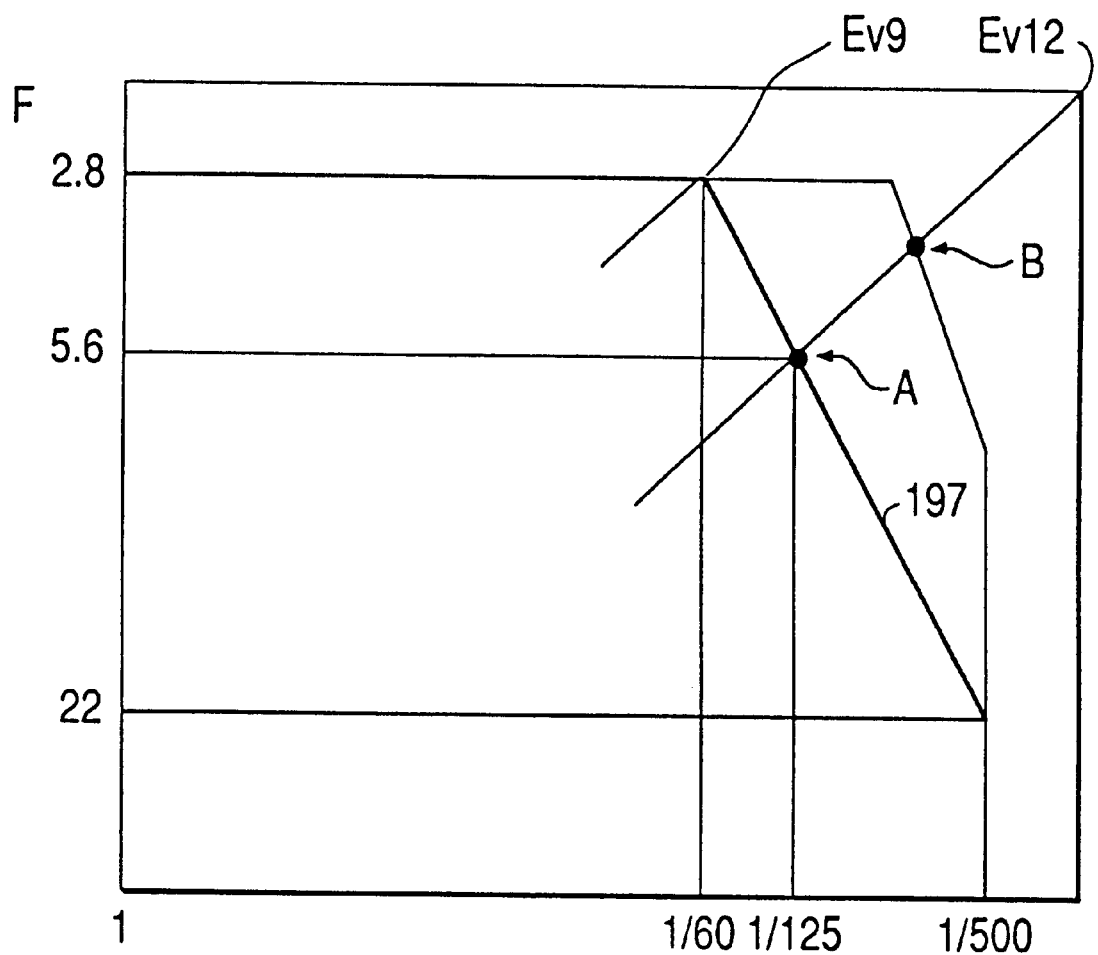
FIG. 31 is a program chart utilized in a camera having a display apparatus in accordance with the sixth embodiment of the present invention.

FIG. 30 is a flowchart showing an example of a program mode exposure setting control program executed by control unit 178 where the stop and shutter speed are set according to the program chart in FIG. 31. The program is initiated in step S110 when the program mode P is set by means of the exposure mode selection lever 134, and the switch 134a is ON. In step S111, it is determined by means of switch 170a whether or not the release button 14 is half depressed; if switch 170a is ON, the release button 14 is half depressed and the program proceeds to step S112. In step S112 photometry is performed by controlling the photometer device 172, and, in addition, the focus detection device 174 is controlled and range measurement is performed. In step S112, the program chart shown in FIG. 31, which has been previously stored in the memory of the control unit 178, is accessed to determine stop value and shutter speed. When the photographic subject brightness is EV 12, as determined by the photometer device 172 in step S112, exposure values (point A) of stop F 5.6 and shutter speed 1/125 are set according to the program chart as shown by the thick line 197 in FIG. 31. The stop value pointer drive circuit 196 is controlled to drive the stepping motor 196m, rotating the stop value pointer 166, as shown in FIG. 28A, to index 5.6 on the stop value scale 164. Furthermore, the photographic lens is focused by means of the photographic lens drive circuit 182 and motor 182m according to the photographic range resulting from range measurement.

Next, in step S114, it is determined whether or not there is an input of a pulse signal from the pulse generator 176 indicating that the command dial 125 is being operated. Specifically, a determination is made as to whether or not a program shift is being performed by means of the command dial 125. In the program mode P, when the command dial 125 is rotated, the stop and the shutter speed are shifted a little for each pulse. Here the unit of shift is, for example, an amount corresponding to a half step in stop. In step S114, if the command dial 125 is being rotated, the program proceeds to step S115; however, if the command dial 125 is not being rotated, the program proceeds to step S118. In step S115, program shift is performed according to the amount of rotation and direction of rotation of the command dial 125, and the stop value pointer 166 is rotated by means of drive circuit 196 and stepping motor 196m. When the command dial 125 is rotated in a direction to open the stop, the exposure value, as shown in FIG. 31, moves from point A on the EV12 line to point B, and accompanying this change, the stop value pointer 166 of the stop value display unit 162 rotates in the clockwise direction. Point B represents the interlock limit beyond which the shutter speed cannot become faster. Furthermore, even if the command dial 125 is rotated, the program is not operated, and the stop value pointer 166, as shown in FIG. 28B, does not rotate from the stop value 4 of the point B. In step S116, it is determined whether or not the interlock limit has been reached. If the interlock limit has been reached, the program proceeds to step S117, and if not, the program returns to step S114. In step S117, under the control of the drive circuit 192, the exposure correction display pointer 146 is set to the index 150 by means of the stepping motor 192. Specifically, by setting pointer 146 to the index 150 a warning is given by means of the exposure correction display pointer 146 of the exposure correction display unit 144 that the shutter speed has reached the interlock limit during the program shift.

In step S118, wherein it was previously determined in step S117 that command dial 125 was not being rotated, it is determined by means of switch 170b whether or not release has been effected by determining whether switch 170b is ON. If release has been effected, the program proceeds to step S119, and if not, the program returns to step S114. In step S119, under the control of the exposure control circuit 184, exposure is performed and the program proceeds to step S120. In step S120, the pointer 146 for the exposure correction display unit 144 is returned to 0, thereby clearing the interlock limit warning display. Furthermore, in step S121, under the control of the film advance drive circuit 180, the film is advanced and, continuing, in step S122 it is determined whether or not photography has been completed. If photography has been completed for all the photographic frames on the film, the program proceeds to step S123; if photography has not been completed, step S123 is skipped and execution of the control program ends. In step S123, if photography is completed, rewinding of the film is performed, and the frame count display pointer 142 is set to the index E.

In the above-described manner, when a stop or shutter speed exceeds an interlock limit accompanying a program shift operation during program exposure mode, this condition can be easily recognized, regardless of set exposure correction values. This is achieved by setting the pointer of the rotary pointer type of exposure correction display unit to an index which warns that the stop or shutter speed has reached the interlock limit.

Figure 32:
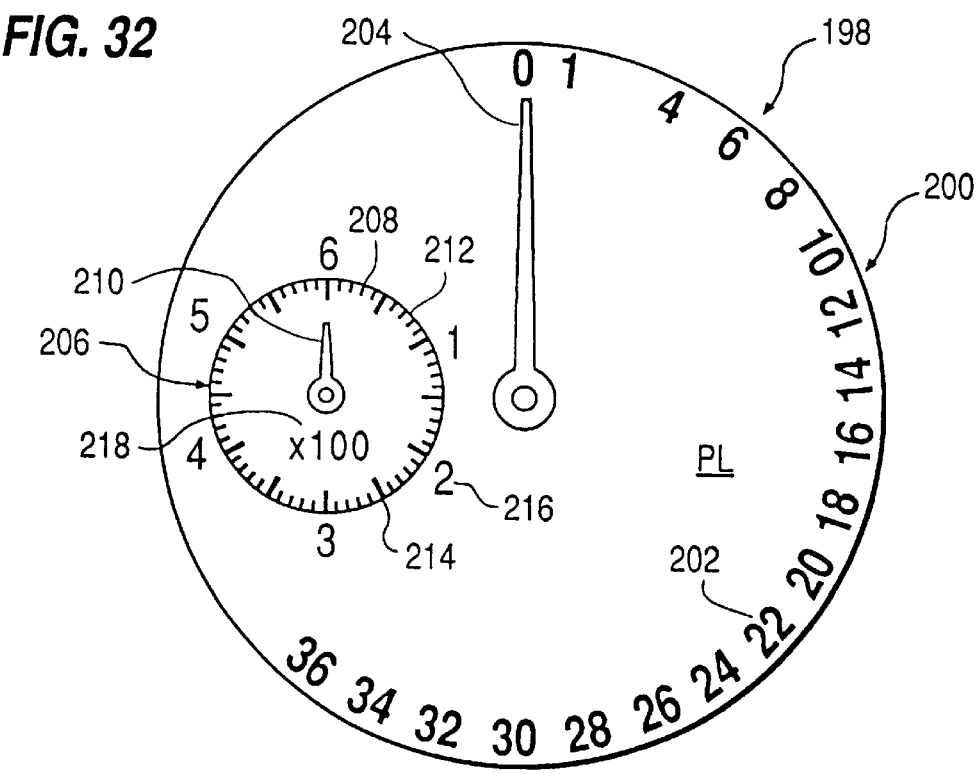
FIG. 32 is an enlarged view of a camera display apparatus in accordance with a seventh embodiment of the present invention.

FIG. 32 is an enlarged view of a display unit 198 for a camera display apparatus according to a seventh embodiment of the present invention. Display unit 198 displays both a photographic frame count and a cumulative photographic frame count after photography is finished. The display device 198 is thus equipped with a photographic frame count display unit 200 and a cumulative photographic frame count display unit 206. The photographic frame count display unit 200 includes a photographic frame count display scale 202, and a pointer 204 which indicates the photographic frame count by pointing to a specific frame count value. The cumulative frame count display unit 206 includes a cumulative frame count display scale 208 and a pointer 210 which indicates the cumulative photographic frame count.

The display scales 202 and 208 are printed on a display dial PL. The photographic frame count display index 202 includes numerals "0"–"36". In a state in which no film cartridge is loaded in the camera 10, the photographic frame count display pointer 204 points to "0" as seen in FIG. 32. When loading and setup have been completed, the pointer 204 points to "1". Thereafter, the pointer 204 is rotated about 6° clockwise for each 1 frame exposure. Furthermore, when the film cartridge is taken out of the camera 10, the pointer 204 is rotated by the stepping motor 222 under the control of control circuit 248 (described below with respect to FIG. 35) to indicate "0".

The cumulative photographic frame counter display 206 has a small scale mark 212 every 6°, a large scale mark 214 every 30°, and every 60° the large scale marks 214 also have numerals 216 "1" through "6" arranged outside them. The reference numeral 218 denotes an inscription "×100" on the cumulative photographic frame counter display 206.

Figure 33:
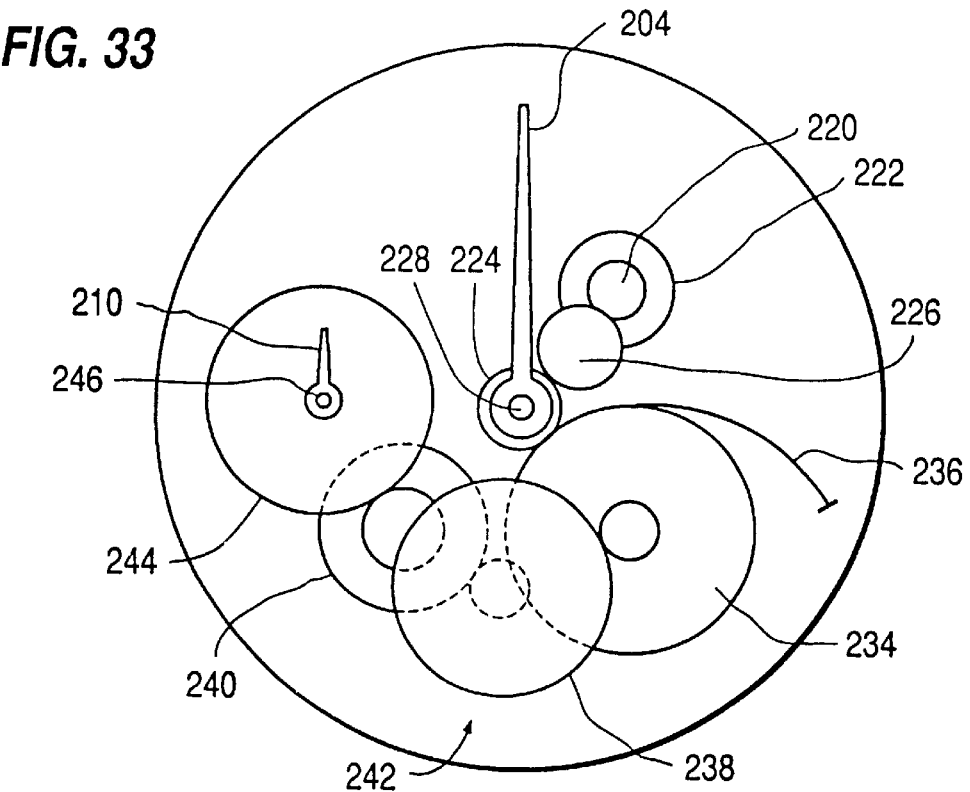
FIG. 33 is a top view illustrating a gear mechanism used in controlling rotation of display pointers in a camera display apparatus in accordance with the seventh embodiment of the present invention.
Figure 34:
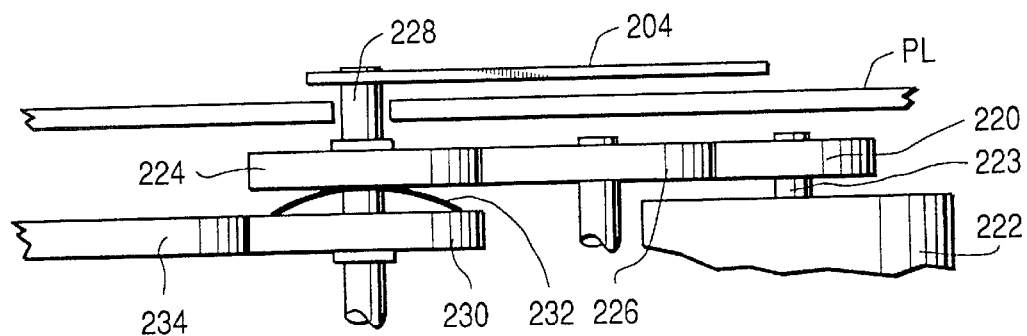
FIG. 34 is a side view of the gear mechanism for controlling display pointers in the camera display apparatus in accordance with the seventh embodiment of the present invention.

FIG. 33 is a top view of a drive mechanism for the display unit 198 according to the seventh embodiment of the present invention, and FIG. 34 is a side view of the drive mechanism shown in FIG. 33. The frame count pointer 204, as shown in FIGS. 33 and 34, is driven in rotation, geared to the film advance, by a stepping motor 222. The cumulative frame count pointer 210 is driven in rotation simultaneously with the pointer 204, via a gear mechanism as described in detail below. Gear wheel 220 is arranged on an output shaft 223 of stepping motor 222. Gear wheel 220 is connected to gear wheel 224 via gear wheel 226, and gear wheel 224 is fixed to a first rotary shaft 228, with which the pointer 204 integrally rotates. Between the gear wheel 230, which is arranged to rotate relative to the first rotary shaft 228, and the gear wheel 224 there is interposed a friction spring 232. The gear wheel 230 rotates due to the transmission of rotational force from gear wheel 224 by the friction spring 232. A gear wheel 234 is geared to the gear wheel 230.

As shown in FIG. 33, the gear wheel 234 is connected to the tip of a spring 236, of arcuate shape. Gear wheel 234 rotates counterclockwise, its clockwise rotation being prevented by the spring 236. Gear wheel 234, gear wheel 238 and gear wheel 240 together constitute a gear train 242. Gear wheel 230 is connected to gear wheel 244 via gear train 242, and gear wheel 244 is fixed to a second rotary shaft 246. The second pointer 210 is fixed to the end of this second rotary shaft 246 and is arranged to rotate integrally with the second rotary shaft 246.

The speed reduction ratio from the gear wheel 230 arranged on the first rotary shaft 228 to the gear wheel 244 arranged on the second rotary shaft 246 is set at 1/10, so that when the pointer 204 makes 1 rotation the second pointer 210 makes 1/10 of a rotation.

Figure 35:
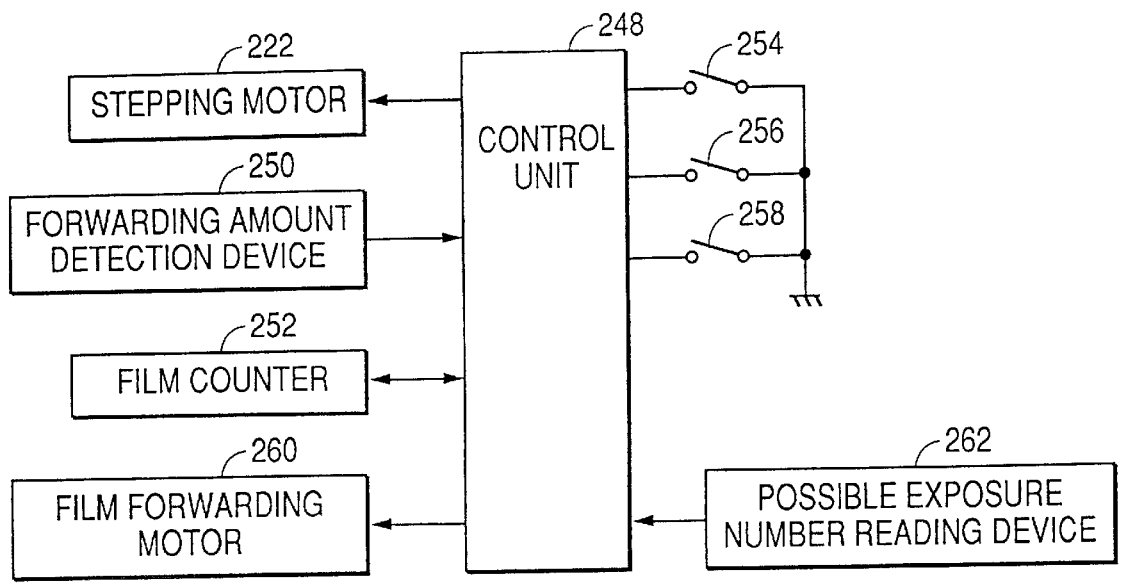
FIG. 35 is a block diagram illustrating circuitry for controlling a camera display apparatus in accordance with the seventh embodiment of the present invention.

FIG. 35 is a block diagram of a control circuit for controlling display unit 198. A control unit 248 includes a CPU, ROM, RAM and the like and receives signals from switches 254, 256, 258 and forwarding amount detection device 250, and film counter 252. The stepping motor 222 receives signals from control unit 248 to drive pointers 204 and 210. A film forwarding motor 260 and an exposure number readout device 262 which reads the possible number of exposures from a film cartridge when the film cartridge is loaded, are also connected to the control unit 248. A film loading detection switch 254 detects a loading of a film cartridge; a cover detection switch 256 detects whether the cartridge cover is open or closed. Switch 258 is a switch which is closed when the camera release button (not shown in the drawing) is fully depressed. Forwarding amount detection device 250 is geared to winding of film and outputs a pulse signal when the film is advanced by one frame. Counter 252 is incremented due to the pulse signal and counts the completed film frame count.

When loading of film is detected by means of the film loading detection switch 254, and a closed cover is detected by means of cartridge cover detection switch 256, control unit 248 drives film forwarding motor 260, forwarding film from the film cartridge to a windup spool shaft. At the same time, the pointer drive stepping motor 222 is rotated in a clockwise direction by a prescribed amount of rotation such that the pointer 204 points to the numeral "1".

Next, when the release button is fully depressed and switch 258 is set ON, the photographic process is performed. After an exposure has been completed, the film forwarding motor 260 is driven and the film is advanced by 1 frame. At this time, the forwarding amount detection device 250 detects forwarding of the film by 1 frame and 1 is added to counter 252. Stepping motor 222 is rotated by a prescribed amount and via the action of gear wheel 220, idle gear wheel 226, and gear wheel 224, the rotary shaft 228 is rotated 6° in a clockwise direction. As a result, the pointer 204 rotates clockwise in a positive direction by 1 scale division, now indicating a portion on display index 202 corresponding to the numeral "2".

At this time, the gear wheel 230 is also rotated clockwise via the action of gear wheel 224 and frictional spring 232 which is in contact with gear wheel 224. Rotary force is thereby transmitted to the second rotary shaft 246, via gear train 242 and gear wheel 244 and the second pointer 210 rotates by 0.6°. When 10 exposures have been completed, the second pointer 210 points to a first division of the cumulative frame count scale, which indicates frame number "10".

After 36 frames have been exposed and photography has been completed, the count value of the film counter 252 is 36, and automatic rewinding is performed by film forwarding motor 260. For each frame of rewinding performed, the count value of the counter 252 is reduced by 1, and in response to this reduction the stepping motor 222 rotates a prescribed amount in the counterclockwise direction. At the same time, the gear wheel 220, which rotates integrally with the stepping motor 222, also rotates in the counterclockwise direction, and via the idle gear wheel 226 and gear wheel 224, the first rotary shaft 228 rotates in a counterclockwise direction, and the pointer 204 rotates counterclockwise 6° backwards.

Moreover, the automatic rewinding is performed when the number of possible exposures of the film cartridge read out by the film number readout device 262, as described above, and the count value of the counter 252, are compared, and the count value in counter 252 equals the number of possible exposures read by the film number readout device 262.

When gear wheel 224 rotates in a counterclockwise direction, the gear wheel 230 connected by the friction spring 232 on gear wheel 230 is also made to rotate counterclockwise, but gear wheel 234 engaged with gear wheel 230 is connected to the tip of the spring 236 and does not rotate. Accordingly, during film rewinding, the cumulative frame count pointer 210 does not rotate, and the indicated cumulative completed photographic frame count is displayed unchanged.

After film rewinding is complete, the opening of the film cartridge cover is detected by the cover detection switch 254, and the stepping motor 222 is not driven when there is no film loaded. Accordingly the first pointer 204 indicates "0".

Figure 36:
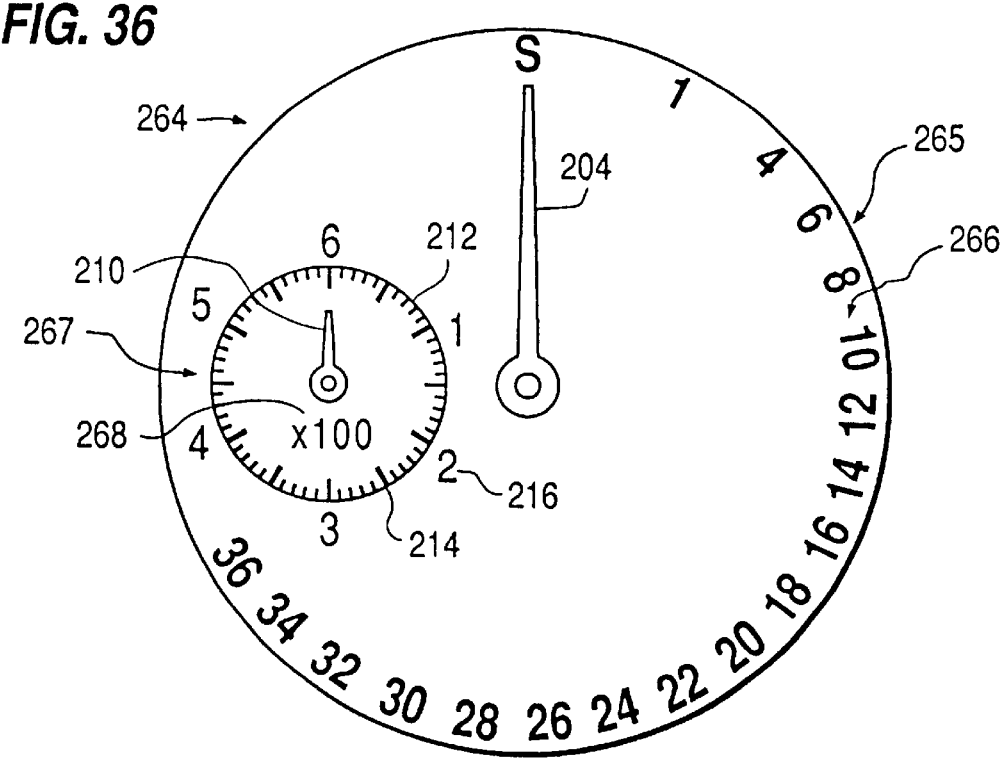
FIG. 36 is an enlarged view of a camera display apparatus which is a first modification of the seventh embodiment of the present invention.
Figure 37:
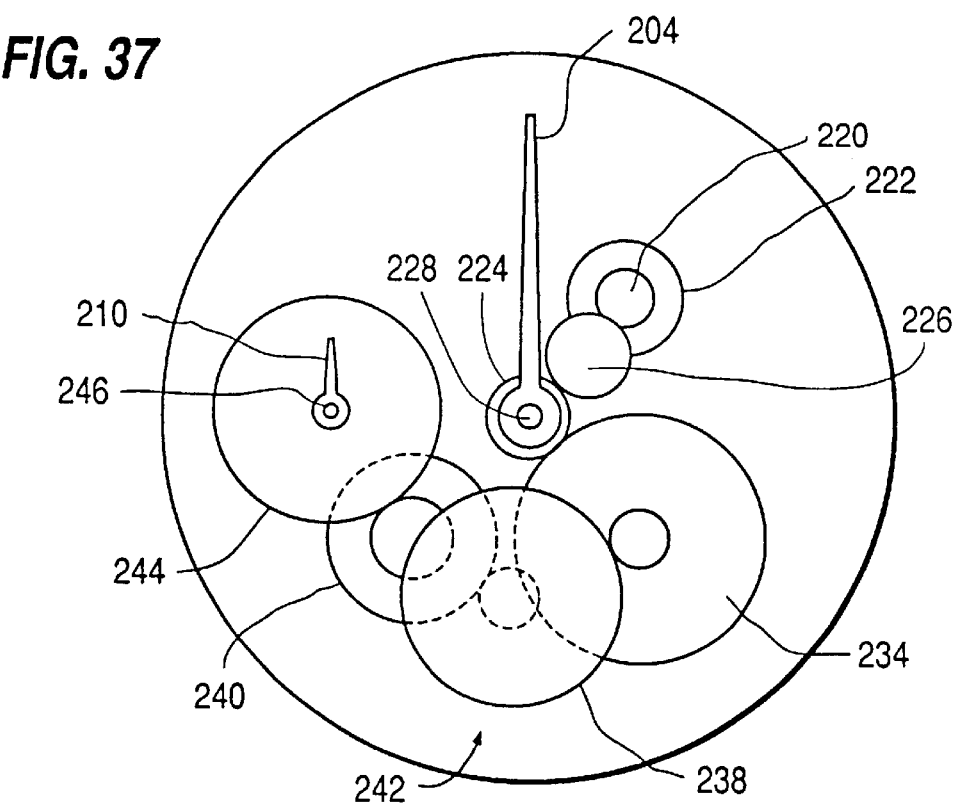
FIG. 37 is a top view of a gear mechanism for controlling display pointers in the camera display apparatus in accordance with the first modification of the seventh embodiment of the present invention.
Figure 38:
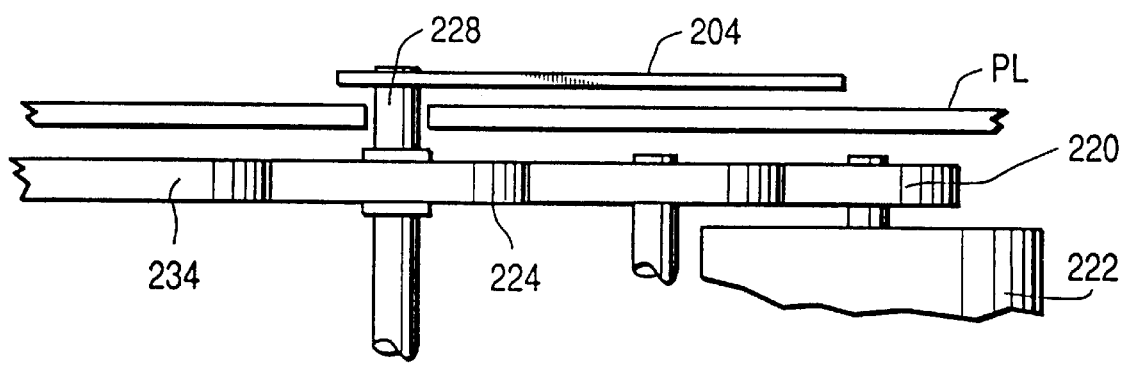
FIG. 38 is a side view of the gear mechanism for controlling display pointers in the camera display apparatus in accordance with the first modification of the seventh embodiment of the present invention.

FIGS. 36–38 show a camera display unit 264 according to a first modification of the seventh embodiment of the present invention. Like elements in the FIGS. of the previously described embodiments are indicated by like reference numerals. According to this modification, when the first pointer 204 makes one rotation, the second pointer 210 advances by one scale division.

This modified display unit 264 is equipped with a photographic frame number display unit 265 and a cumulative photographic frame count display unit 267. The display scale portion 266 of the photographic frame number display unit 265 is provided with "S" instead of "0", as was the case in the cumulative completed photographic frame count display portion shown in FIG. 32. When no film is loaded, the pointer 204 points to "S", and when film loading is complete the first pointer 204 points to "1". The cumulative photographic frame count display unit 267 includes display portion having a small scale mark 212 every 6°, a large scale mark 214 every 30°, and numerals 216 arranged outside large scale mark 214 every 60°. The display unit 267 also bears the inscription "×10" 268. When film has been rewound into the film cartridge the second pointer 210 rotates one scale division in a clockwise direction.

FIG. 37 is a top view of a pointer drive mechanism according to the first modification of the seventh embodiment of the present invention. FIG. 38 is a partial side view of the pointer drive mechanism shown in FIG. 37. The gear wheel 230, friction spring 232, and connection spring 236 shown in the embodiment of FIGS. 32 and 33 are omitted here. The gear wheel 224 is directly engaged with the gear wheel 234, and is connected to the first rotary shaft 228 via the gear train 242. The speed reduction ratio of the gear train 242 is such that when the first pointer 204 makes 1 rotation, the second pointer 210 moves 1 division. In other words, a step of 6° is set and the speed reduction ratio of the gear train of the first modification of the seventh embodiment is 1/60.

When 36 frames of exposures are completed automatic rewinding is commenced, as described below, and the stepping motor 222 commences rotation in the same direction as the photographic frame number indication operation. The first pointer 204 is driven to rotate in a clockwise direction to the position for the first pointer 204 to display "S". At this time, the rotary force of the first pointer 204, is transmitted to the second pointer 210 via gear wheel 224, gear wheel train 242, and rotary shaft 246 causing the second pointer 210 to rotate in a clockwise direction by 6° pointing to the first division on the cumulative frame count scale. After the completion of film rewinding, the opening of the cartridge cover is detected by the cover detection switch 254, and the stepping motor 222 is not driven. When no film is loaded the first pointer 204 indicates "S".

Figure 39:
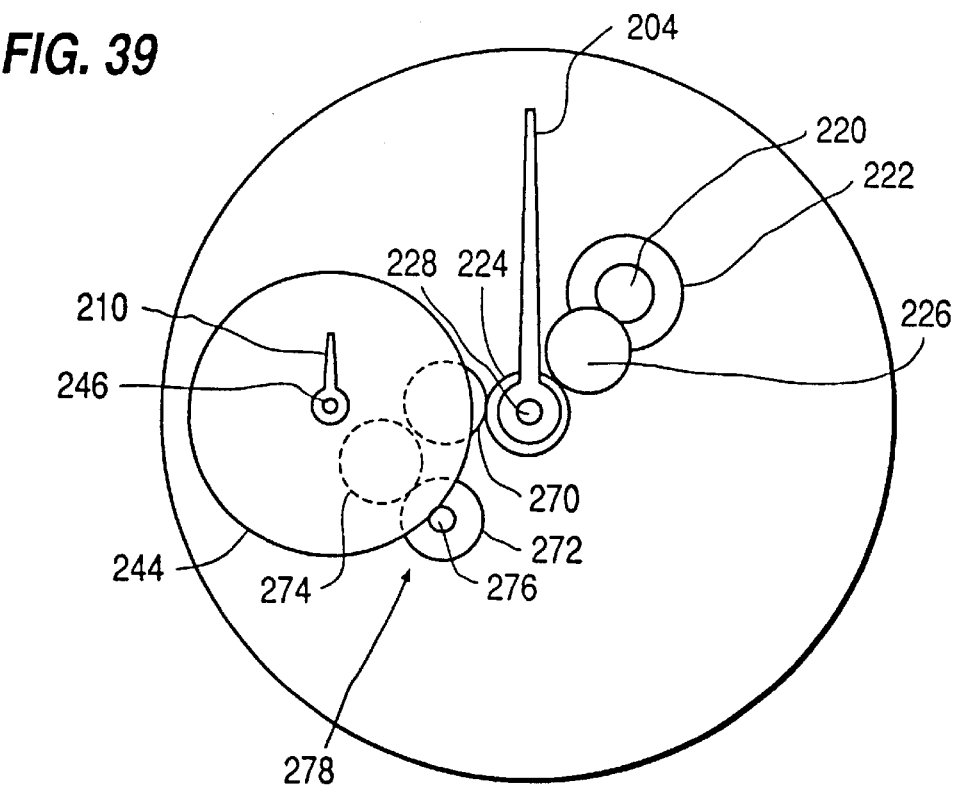
FIG. 39 is a top view of a gear mechanism for controlling display pointers in a camera display apparatus which is a second modification of the seventh embodiment of the present invention.
Figure 40:
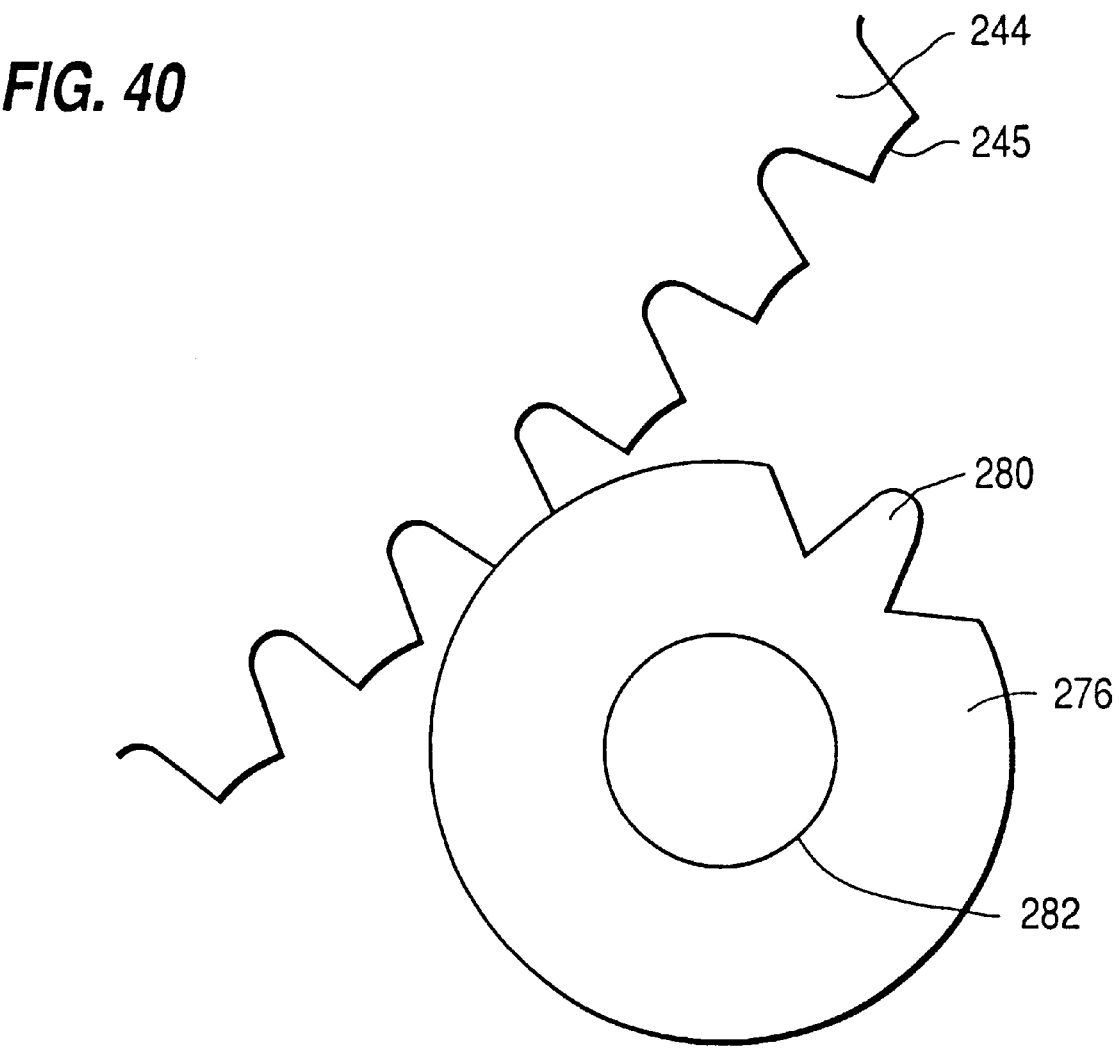
FIG. 40 is an enlarged view of the gear mechanism for controlling display pointers in a camera display apparatus in accordance with the second modification of the seventh embodiment of the present invention.

A second modification of the display apparatus according to the seventh embodiment of the present invention is shown in FIGS. 39 and 40. FIG. 39 is an enlarged top view of a pointer drive mechanism according to the second modification of the seventh embodiment. FIG. 40 illustrates an enlarged view of a gearing mechanism utilized in the second modification of the seventh embodiment. According to this second modification, similar to the first modification described above, when the first pointer 204 makes 1 rotation, the second pointer 210 advances 1 scale division. A difference is the gearing mechanism which transmits the rotational force from the pointer 204 to the second pointer 210.

As seen in FIG. 39, gear wheel 224 is engaged with gear wheel 270 and a Geneva gear 276 is driven via gear wheel 270 and gear wheels 274 and 272 having the same tooth number. Here the gear wheels 270, 274 and 272 constitute a gear train 278. The Geneva gear 276, as shown in FIG. 40, has a single tooth 280 and is mounted integrally with shaft 282 of gear wheel 272. While the Geneva gear wheel 276 makes one rotation, the gear tooth 280 is in engagement only once with the gear wheel 244, and the gear wheel 244 is rotated by 6° in a clockwise direction.

The second modification of the seventh embodiment operates in a manner similar to the first modification. When 1 frame exposure has been completed, and the film is advanced one frame, the first pointer 204 rotates 6° in a clockwise direction. When 36 frames of photography have been completed, automatic rewinding is commenced and the stepping motor 222 commences to rotate in a clockwise direction. The stepping motor 222 stops with the first pointer 204 in a position pointing to "S". Accompanying this automatic rewinding, between the operation and stopping of the stepping motor 222, the Geneva gear 276 receives the rotary force of the first rotary shaft 228 from the gear train 278 causing rotation, and the single tooth portion 280 engages with the gear wheel 244 and rotates the second rotary shaft 246 by 6° in a clockwise direction. Accordingly, on completion of exposure of 1 film cartridge, the first pointer 204 makes 1 rotation and indicates "S", and the second pointer 210 steps 1 scale division, the value indicated by the second pointer 210 being the indication of the cumulative exposed film number.

After the completion of film rewinding, opening of the cartridge cover is detected by the cover detection switch 254, and in a manner similar to the first modification of the seventh embodiment, the stepping motor 222 is not driven. Accordingly, when no film is loaded the first pointer 204 continues to indicate "S". Then on loading a film the first pointer 204 indicates "1".

Although the display device according to the seventh embodiment of the present invention has been described with two modifications, it should be realized that other changes are possible.

For example, when displaying the cumulative exposed film number on display unit 206, if the speed reduction ratio of the gear train 242 is set such that the cumulative exposed film pointer 210 steps 1 division when 36 frames of exposures have been completed, then the pointer 210, for each completion of rewinding of a cartridge, steps by 1 division, and can display the cumulative exposed film number.

The photographic frame count display unit 264 of the first and second modifications may utilize the photographic frame count display unit 200.

The description has been given in terms of automatic rewinding, but when rewinding is performed by manual operation of a rewind button, the cumulative exposed film number can also be displayed by the pointer 204.

The description has been given in terms of a film with 36 exposures, but there is no limitation to this number.

The display index 202 portion indicated by the first pointer 204 was such as to display the number of exposures finished, but may instead be such as to show the number of exposures remaining.

Although a few preferred embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display apparatus in a camera for displaying photographic information using a rotating element, comprising:
   means for generating camera control information;
   display means for displaying photographic information, including at least one rotating pointer and at least one display scale having indices representing the photographic information;

drive means for rotating said at least one rotating pointer to a position on said at least one display scale; and control means for receiving said camera control information, for calculating an amount said at least one rotating pointer is to be rotated based on the camera control information, and for controlling said drive means to rotate said at least one rotating pointer according to the calculated amount of rotation to an index on said pointer scale representing said photographic information, wherein said means for generating camera control information includes an exposure number detection means for detecting a total number of exposures of loaded film, said display means includes a first display scale indicating a photographic frame count, and a second display scale indicating a remaining number of frames of film, and said control means determines a remaining number of frames to be exposed and controls said drive means to drive said at least one rotating pointer to said first display scale when a remaining number of frames to be exposed is greater than a predetermined number, and to said second display scale when the remaining number of frames is less than the predetermined number.

2. The display apparatus as claimed in claim 1, wherein said first display scale and said second display scale include plural indicia of information and wherein said plural indicia for said second display scale are positioned with larger spacings between indicia than said plural indicia for said first display scale.

3. A display apparatus in a camera for displaying photographic information using a rotating element, comprising:

means for generating camera control information;

display means for displaying photographic information, including at least one rotating pointer and at least one display scale having indices representing the photographic information;

drive means for rotating said at least one rotating pointer to a position on said at least one display scale; and control means for receiving said camera control information, for calculating an amount said at least one rotating pointer is to be rotated based on the camera control information, and for controlling said drive means to rotate said at least one rotating pointer according to the calculated amount of rotation to an index on said pointer scale representing said photographic information, wherein said means for generating camera control information includes a self-timer mode switch for setting said camera in a self-timer mode of operation wherein a predetermined time until exposure is set, said display means includes a single display scale and a single rotating pointer, and said control means controls said drive means, when said self-timer mode switch is ON, to rotate said single rotating pointer to display a time until exposure on said single display scale, and when said self-timer mode switch is OFF, rotates said single rotating pointer to display frame count information on said single display scale.

4. The display apparatus as claimed in claim 3, wherein said control means controls said drive means to rotate said single rotating pointer to indicate frame count information on said single display scale after a predetermined amount of time has elapsed in a self-timer mode.

5. A display apparatus in a camera for displaying photographic information using a rotating element, comprising:

means for generating camera control information;

display means for displaying photographic information, including at least one rotating pointer and at least one display scale having indices representing the photographic information;

drive means for rotating said at least one rotating pointer to a position on said at least one display scale; and control means for receiving said camera control information, for calculating an amount said at least one rotating pointer is to be rotated based on the camera control information, and for controlling said drive means to rotate said at least one rotating pointer according to the calculated amount of rotation to an index on said pointer scale representing said photographic information, wherein said means for generating camera control information includes a self-timer mode switch for setting said camera in a self-timer mode of operation wherein a predetermined time until exposure is set, said display means includes a single display scale and at least two rotating pointers, and said control means controls said drive means to rotate a first rotating pointer to an index indicating a self-timer mode of operation, and to rotate a second rotating pointer to an index corresponding to a predetermined time until exposure when said self-timer mode switch in ON, and rotates said second rotating pointer to a frame count index when said self-timer mode switch is OFF.

6. A display apparatus in a camera for displaying photographic information using a rotating element, comprising:

means for generating camera control information;

display means for displaying photographic information, including at least one rotating pointer and at least one display scale having indices representing the photographic information;

drive means for rotating said at least one rotating pointer to a position on said at least one display scale; and control means for receiving said camera control information, for calculating an amount said at least one rotating pointer is to be rotated based on the camera control information, and for controlling said drive means to rotate said at least one rotating pointer according to the calculated amount of rotation to an index on said pointer scale representing said photographic information, wherein said means for generating camera control information includes photometer means for detecting a brightness of a photographic subject, exposure calculation means for calculating a stop value and a shutter speed in proportion to the detected brightness according to a predetermined program chart, and means for detecting whether said stop or said shutter speed has exceeded a predetermined limit, said display means includes an exposure correction display section having an exposure correction display pointer and a display scale having a warning index, and said control means drives said exposure correction display pointer to said warning index when at least one of said stop or said shutter speed has exceeded said predetermined limit.

7. The display apparatus as claimed in claim 6, wherein said means for generating camera control information further includes exposure correction value setting means for setting an exposure correction value; and said control means sets said rotating pointer at said warning index regardless of said exposure correction value.

8. A display apparatus in a camera for displaying photographic information using a rotating pointer, comprising:

display means for displaying photographic information, including at least one display pointer and at least one display scale, said at least one display scale representing said photographic information, and said at least one pointer indicating said photographic information by pointing to said display scale;

drive means for driving said at least one rotating pointer to a position on said at least one display scale;

means for setting said camera in one of an operative state or an inoperative state; and control means for controlling said drive means to position said at least one display pointer to a display index on said display scale indicating said inoperative state when said means for setting sets said camera in an inoperative state, and for controlling said drive means to position said at least one rotary pointer to a display index indicating a frame count number when said means for setting sets said camera is in an operative state.

9. The display apparatus as claimed in claim 8, wherein said control means detects when said means for setting switches said camera from an operative to an inoperative state, and controls said drive means to rotate said at least one rotating pointer to display an inoperative state.

10. The display apparatus as claimed in claim 8, wherein said control means detects when said means for setting is switched from an inoperative to an operative state, and controls said drive means to rotate said rotating pointer to display said frame count.

11. A display apparatus in a camera for displaying photographic information using a rotating pointer, comprising:

means for detecting a number of exposures of film loaded in said camera;

display means for displaying photographic information, including a rotating pointer, a first display scale region for displaying a photographic frame count of said film, and a second display scale region for displaying a remaining number of frames of the film which can be exposed;

drive means for driving said rotating pointer;

control means for determining a remaining number of frames of film which can be exposed, and for controlling said drive means to rotate said rotating pointer to said second display scale region when said remaining number of frames of film which can be exposed is less than a predetermined number.

12. The display apparatus as claimed in claim 11, wherein said first display scale region includes indices representing a photographic frame count, and said second display scale region includes indices representing a remaining frame count.

13. The display apparatus as claimed in claim 12, wherein said first display scale region and said second display scale region include plural indicia of information, and said plural indicia in said second display region are located at larger spacings than said plural indicia in said first display region.

14. A display apparatus in a camera for displaying photographic information using rotating pointers comprising:

display means for displaying photographic information, including a first display unit having a first display pointer and first display indices, a second display unit including a second display pointer and second display indices wherein said second display unit is located in a position which is at least partially overlapped by said first display pointer;

drive means for driving said first display pointer; and control means for controlling said drive means to rotate said first display pointer such that said first display pointer does not remain stationary over said second display unit.

15. The display apparatus as claimed in claim 14, wherein the first display unit displays a stop value of a photographic lens.

16. The display apparatus as claimed in claim 14, wherein said first display unit displays a shutter speed.

17. The display apparatus as claimed in claim 14, wherein the first display unit displays a distance of a photographic subject.

18. The display apparatus as claimed in claim 14, wherein said first display unit displays a photographic frame count of film.

19. The display apparatus as claimed in claim 14, further comprising:

a third display unit including a third display pointer and third display indices, and located at a position in which it is at least partially overlapped by said first display pointer, and said control means controls said drive means to rotate said first display pointer such that said first display pointer does not remain stationary over any of said second display unit and said third display unit.

20. A display apparatus in a camera for displaying photographic information using rotating pointers, comprising:

display means for displaying photographic information, including a first display unit having a first rotating pointer and a first display scale, and a second display unit having a second rotating pointer and a second display scale;

drive means for rotating said first rotating pointer; and control means for controlling said drive means to drive said first rotating pointer and to control rotation of said second rotating pointer in a predetermined relation to said first rotating pointer when said first rotating pointer is rotated by said drive means.

21. The display apparatus as claimed in claim 20, wherein said control means includes a gear mechanism.

22. The display apparatus as claimed in claim 21, wherein said gear mechanism is a reduction gear train which transmits rotation of said first rotating pointer to said second rotating pointer at reduced speed.

23. The display apparatus as claimed in claim 21, wherein said gear mechanism includes a Geneva gear which rotates said second pointer by a unit angle when said first pointer makes a complete rotation.

24. A display apparatus in a camera for displaying photographic information, comprising photometer means for detecting brightness of a photographic subject;

exposure calculation means for calculating a stop and a shutter speed in proportion to said detected brightness according to a predetermined program chart;

exposure change means for changing said stop and said shutter speed in accordance with the calculation by said exposure calculation means;

limit detection means for detecting whether at least one of said stop and said shutter speed have exceeded a preset limit accompanying a change by said exposure change means;

exposure correction value setting means for setting an exposure correction value;

exposure correction display means for displaying an exposure correction value, including a rotating pointer and a display scale which represents an exposure correction value and a warning index which indicates said preset limit has been exceeded;

drive means for rotating said rotating pointer; and control means for controlling said drive means to rotate said rotating pointer to said warning index when said limit detection means detects that said at least one of said stop and said shutter speed has exceeded said preset limit regardless of said exposure correction value set by said exposure correction value setting means.

25. A display apparatus in a camera to display photographic information using a rotating element, comprising:

a generating unit to generate camera control information;

a display unit to display photographic information, including at least one rotating pointer and at least one display scale having indices representing the photographic information;

a drive unit to rotate said at least one rotating pointer to a position on said at least one display scale; and a control unit to receive said camera control information, to calculate an amount said at least one rotating pointer is to be rotated based on the camera control information, and to control said drive unit to rotate said at least one rotating pointer according to the calculated amount of rotation to an index on said pointer scale representing said photographic information, wherein said generating unit includes an exposure number detection unit to detect a total number of exposures of loaded film, said display unit includes a first display scale indicating a photographic frame count, and a second display scale indicating a remaining number of frames of film, and said control unit determines a remaining number of frames to be exposed and controls said drive unit to drive said at least one rotating pointer to said first display scale when a remaining number of frames to be exposed is greater than a predetermined number, and to said second display scale when the remaining number of second frames is less than the predetermined number.

26. A display apparatus in a camera to display photographic information using a rotating element, comprising:

a generating unit to generate camera control information;

a display unit to display photographic information, including at least one rotating pointer and at least one display scale having indices representing the photographic information;

a drive unit to rotate said at least one rotating pointer to a position on said at least one display scale; and a control unit to receive said camera control information, to calculate an amount said at least one rotating pointer is to be rotated based on the camera control information, and to control said drive unit to rotate said at least one rotating pointer according to the calculated amount of rotation to an index on said pointer scale representing said photographic information, wherein said generating control unit includes a self-timer mode switch to set said camera in a self-timer mode of operation wherein a predetermined time until exposure is set, said display unit includes a single display scale and a single rotating pointer, and said control unit controls said drive unit, when said self-timer mode switch is ON, to rotate said single rotating pointer to display a time until exposure on said single display scale, and when said self-timer mode switch is OFF, rotates said single rotating pointer to display frame count information on said single display scale.

27. A display apparatus in a camera to display photographic information using a rotating element, comprising:

a generating unit to generate camera control information;

a display unit to display photographic information, including at least one rotating pointer and at least one display scale having indices representing the photographic information;

a drive unit to rotate said at least one rotating pointer to a position on said at least one display scale; and a control unit to receive said camera control information, to calculate an amount said at least one rotating pointer is to be rotated based on the camera control information, and to control said drive unit to rotate said at least one rotating pointer according to the calculated amount of rotation to an index on said pointer scale representing said photographic information, wherein said generating unit includes a self-timer mode switch for setting said camera in a self-timer mode of operation wherein a predetermined time until exposure is set, said display unit includes a single display scale and at least two rotating pointers, and said control unit controls said drive unit to rotate a first rotating pointer to an index indicating a self-timer mode of operation, and to rotate a second rotating pointer to an index corresponding to a predetermined time until exposure when said self-timer mode switch in ON, and rotates said second rotating pointer to a frame count index when said self-timer mode switch is OFF.

28. A display apparatus in a camera to display photographic information using a rotating element, comprising:

a generating unit to generate camera control information;

a display unit to display photographic information, including at least one rotating pointer and at least one display scale having indices representing the photographic information;

a drive unit to rotate said at least one rotating pointer to a position on said at least one display scale; and a control unit to receive said camera control information, to calculate an amount said at least one rotating pointer is to be rotated based on the camera control information, and to control said drive unit to rotate said at least one rotating pointer according to the calculated amount of rotation to an index on said pointer scale representing said photographic information, wherein said generating unit includes photometer unit to detect a brightness of a photographic subject, exposure calculation unit to calculate a stop value and a shutter speed in proportion to the detected brightness according to a predetermined program chart, and detecting unit to detect whether said stop or said shutter speed has exceeded a predetermined limit, said display unit includes an exposure correction display section having an exposure correction display pointer and a display scale having a warning index, and said control unit drives said exposure correction display pointer to said warning index when at least one of said stop or said shutter speed has exceeded said predetermined limit.

29. A display apparatus in a camera to display photographic information using a rotating pointer, comprising:

a display unit to display photographic information, including at least one display pointer and at least one display scale, said at least one display scale representing said photographic information, and said at least one pointer indicating said photographic information by pointing to said display scale;

a unit to drive said at least one rotating pointer to a position on said at least one display scale;

a setting unit to set said camera in one of an operative state or an inoperative state; and a control unit to control said drive unit to position said at least one display pointer to a display index on said display scale indicating said inoperative state when said setting unit sets said camera in an inoperative state, and to control said the drive unit to position said at least one rotary pointer to a display index indicating a frame count number when said setting unit sets said camera is in an operative state.

30. The display apparatus as claimed in claim 29, wherein said control unit detects when said setting unit switches said camera from an operative to an inoperative state, and controls said drive unit to rotate said at least one rotating pointer to display an inoperative state.

31. The display apparatus as claimed in claim 29, wherein said control unit detects when said setting unit switches said camera from an inoperative to an operative state, and controls said drive unit to rotate said rotating pointer to display said frame count.

32. A display apparatus in a camera to display photographic information using a rotating pointer, comprising:

a detecting unit to detect a number of exposures of film loaded in said camera;

a display unit to display photographic information, including a rotating pointer, a first display scale region to display a photographic frame count of said film, and a second display scale region to display a remaining number of frames of the film which can be exposed;

a drive unit to drive said rotating pointer; and a control unit to determine a remaining number of frames of film which can be exposed, and to control said drive unit to rotate said rotating pointer to said second display scale region when said remaining number of frames of film which can be exposed is less than a predetermined number.

33. A display apparatus in a camera to display photographic information using rotating pointers, comprising:

a display unit to display photographic information, including a first display unit having a first display pointer and first display indices, a second display unit including a second display pointer and second display indices wherein said second display unit is located in a position which is at least partially overlapped by said first display pointer;

a drive unit to drive said first display pointer; and a control unit to control said drive unit to rotate said first display pointer such that said first display pointer does not remain stationary over said second display unit.

34. A display apparatus in a camera to display photographic information using rotating pointers, comprising:

a display unit to display photographic information, including a first display unit having a first rotating pointer and a first display scale, and a second display unit having a second rotating pointer and a second display scale;

a drive unit to rotate said first rotating pointer; and a control unit to control said drive unit to drive said first rotating pointer and to control rotation of said second rotating pointer in a predetermined relation to said first rotating pointer when said first rotating pointer is rotated by said drive unit.

35. A display apparatus in a camera to display photographic information, comprising:

a photometer unit to detect a brightness of a photographic subject;

an exposure calculation unit to calculate a stop and a shutter speed in proportion to said detected brightness according to a predetermined program chart;

an exposure change unit to change said stop and said shutter speed in accordance with the calculation by said exposure calculation unit;

a limit detection unit to detect whether at least one of said stop and said shutter speed have exceeded a preset limit accompanying a change by said exposure change unit;

an exposure correction value setting unit to set an exposure correction value;

an exposure correction display unit to display an exposure correction value, including a rotating pointer and a display scale which represents an exposure correction value and a warning index which indicates said preset limit has been exceeded;

a drive unit to rotate said rotating pointer; and a control unit to control said drive unit to rotate said rotating pointer to said warning index when said limit detection unit detects that said at least one of said stop and said shutter speed has exceeded said preset limit regardless of said exposure correction value set by said exposure correction value setting unit.

* * * * *

UNITED STATES PATENT AND TRADEMARK OFFICE
CERTIFICATE OF CORRECTION

PATENT NO.    : 6,510,287 B1
DATED         : January 21, 2003
INVENTOR(S)   : Daiki Tsukahara et al.

It is certified that error appears in the above-identified patent and that said Letters Patent is hereby corrected as shown below:

<u>Title page,</u>
Item [30], Foreign Application Priority Data,
change "Sep. 4, 1992   (JP)  4-245140" to -- Sept. 14, 1992  (JP)  4-245140 --;
change "Sep. 22, 1992  (JP)  4-257738" to -- Sept. 22, 1992  (JP)  4-252738 --;
change "Oct. 30, 1992  (JP)  4-281939" to -- Oct. 20, 1992   (JP)  4-281939 --.

Signed and Sealed this

Twenty-third Day of March, 2004

JON W. DUDAS
*Acting Director of the United States Patent and Trademark Office*